United States Patent
Doddaiah et al.

(10) Patent No.: US 12,222,863 B1
(45) Date of Patent: Feb. 11, 2025

(54) STORAGE SYSTEM WITH EFFICIENT DATA PREFETCH FOR MULTIPLE STORAGE CONTROLLERS

(71) Applicant: Dell Products L.P., Round Rock, TX (US)

(72) Inventors: Ramesh Doddaiah, Westborough, MA (US); Arieh Don, Newton, MA (US); Sanjib Mallick, Bangalore (IN); Vinay G. Rao, Bangalore (IN)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 18/398,324

(22) Filed: Dec. 28, 2023

(51) Int. Cl.
*G06F 12/0862* (2016.01)

(52) U.S. Cl.
CPC .. *G06F 12/0862* (2013.01); *G06F 2212/6026* (2013.01)

(58) Field of Classification Search
CPC ............. G06F 12/0862; G06F 2212/0626
See application file for complete search history.

(56) References Cited

U.S. PATENT DOCUMENTS

| | | |
|---|---|---|
| 6,567,397 B1 | 5/2003 | Campana, Jr. et al. |
| 6,687,746 B1 | 2/2004 | Shuster et al. |
| 6,697,875 B1 | 2/2004 | Wilson |
| 7,275,103 B1 | 9/2007 | Thrasher et al. |
| 7,454,437 B1 | 11/2008 | Lavallee et al. |
| 7,617,292 B2 | 11/2009 | Moore et al. |
| 7,668,981 B1 | 2/2010 | Nagineni et al. |
| 7,770,053 B1 | 8/2010 | Bappe et al. |
| 7,809,912 B1 | 10/2010 | Raizen et al. |
| 7,818,428 B1 | 10/2010 | Lavallee et al. |
| 7,890,664 B1 | 2/2011 | Tao et al. |

(Continued)

FOREIGN PATENT DOCUMENTS

| | | |
|---|---|---|
| CN | 103677927 B | 2/2017 |
| EP | 1117028 A2 | 7/2001 |
| EP | 2667569 A1 | 11/2013 |

OTHER PUBLICATIONS

International Search Report and Written Opinion of PCT/US2019/052549 dated Dec. 4, 2019, 13 pages.

(Continued)

*Primary Examiner* — Michael Krofcheck
(74) *Attorney, Agent, or Firm* — Ryan, Mason & Lewis, LLP

(57) ABSTRACT

An apparatus in an illustrative embodiment comprises at least one processing device, with the processing device being configured to receive in a storage system from a host device an indication of a data size utilized in a multi-path layer of the host device to select paths for delivery of input-output operations to different storage controllers of the storage system, to determine in the storage system a prefetch data size based at least in part on the data size indication received from the host device, and responsive to detection in the storage system of sequential data reads in input-output operations received from the host device, to prefetch from one or more backend storage devices of the storage system, into a memory associated with a particular one of the storage controllers of the storage system, an amount of data that is determined based at least in part on the prefetch data size.

20 Claims, 4 Drawing Sheets

(56) References Cited

U.S. PATENT DOCUMENTS

| | | |
|---|---|---|
| 7,904,681 B1 | 3/2011 | Bappe et al. |
| 7,925,872 B2 | 4/2011 | Lai et al. |
| 8,250,256 B2 | 8/2012 | Ghosalkar et al. |
| 8,285,825 B1 | 10/2012 | Nagaraj et al. |
| 8,825,919 B1 | 9/2014 | Lim et al. |
| 8,832,334 B2 | 9/2014 | Okita |
| 8,874,746 B1 | 10/2014 | Gonzalez |
| 9,026,694 B1 | 5/2015 | Davidson et al. |
| 9,201,803 B1 | 12/2015 | Derbeko et al. |
| 9,400,611 B1 | 7/2016 | Raizen |
| 9,430,368 B1 | 8/2016 | Derbeko et al. |
| 9,594,780 B1 | 3/2017 | Esposito et al. |
| 9,647,933 B1 | 5/2017 | Tawri et al. |
| 9,672,160 B1 | 6/2017 | Derbeko et al. |
| 9,778,852 B1 | 10/2017 | Marshak et al. |
| 10,289,325 B1 | 5/2019 | Bono |
| 10,353,714 B1 | 7/2019 | Gokam et al. |
| 10,439,878 B1 | 10/2019 | Tah et al. |
| 10,474,367 B1 | 11/2019 | Mallick et al. |
| 10,476,960 B1 | 11/2019 | Rao et al. |
| 10,521,369 B1 | 12/2019 | Mallick et al. |
| 10,606,496 B1 | 3/2020 | Mallick et al. |
| 10,637,917 B2 | 4/2020 | Mallick et al. |
| 10,652,206 B1 | 5/2020 | Pusalkar et al. |
| 10,754,572 B2 | 8/2020 | Kumar et al. |
| 10,757,189 B2 | 8/2020 | Mallick et al. |
| 10,764,371 B2 | 9/2020 | Rao et al. |
| 10,789,006 B1 | 9/2020 | Gokam et al. |
| 10,817,181 B2 | 10/2020 | Mallick et al. |
| 10,838,648 B2 | 11/2020 | Sharma et al. |
| 10,880,217 B2 | 12/2020 | Mallick et al. |
| 10,884,935 B1 | 1/2021 | Doddaiah |
| 10,911,402 B2 | 2/2021 | Pusalkar et al. |
| 10,936,220 B2 | 3/2021 | Mallick et al. |
| 10,936,335 B2 | 3/2021 | Mallick et al. |
| 10,949,104 B2 | 3/2021 | Marappan et al. |
| 10,996,879 B2 | 5/2021 | Gokam |
| 11,016,699 B2 | 5/2021 | Anchi et al. |
| 11,016,783 B2 | 5/2021 | Rao et al. |
| 11,044,313 B2 | 6/2021 | Patel et al. |
| 11,044,347 B2 | 6/2021 | Kumar et al. |
| 11,050,660 B2 | 6/2021 | Rao et al. |
| 11,093,155 B2 | 8/2021 | Anchi et al. |
| 11,106,381 B2 | 8/2021 | Rao et al. |
| 11,126,358 B2 | 9/2021 | Kumar et al. |
| 11,126,363 B2 | 9/2021 | Tidke et al. |
| 11,157,203 B2 | 10/2021 | Gokam et al. |
| 11,366,771 B2 | 6/2022 | Smith et al. |
| 11,615,340 B2 | 3/2023 | Mallick et al. |
| 2002/0023151 A1 | 2/2002 | Iwatani |
| 2002/0103923 A1 | 8/2002 | Cherian et al. |
| 2004/0010563 A1 | 1/2004 | Forte et al. |
| 2006/0026346 A1* | 2/2006 | Kadoiri ................. G06F 3/061 711/170 |
| 2006/0277383 A1 | 12/2006 | Hayden et al. |
| 2007/0174849 A1 | 7/2007 | Cheung et al. |
| 2007/0214335 A1* | 9/2007 | Bellows ............... G11C 7/1012 711/167 |
| 2008/0043973 A1 | 2/2008 | Lai et al. |
| 2008/0201458 A1 | 8/2008 | Salli |
| 2008/0301332 A1 | 12/2008 | Butler et al. |
| 2009/0259749 A1 | 10/2009 | Barrett et al. |
| 2010/0313063 A1 | 12/2010 | Venkataraja et al. |
| 2010/0318692 A1* | 12/2010 | Koll ....................... G06F 3/0617 710/33 |
| 2011/0197027 A1 | 8/2011 | Balasubramanian et al. |
| 2011/0296230 A1 | 12/2011 | Chen et al. |
| 2012/0102369 A1 | 4/2012 | Hiltunen et al. |
| 2012/0246345 A1 | 9/2012 | Contreras et al. |
| 2013/0117766 A1 | 5/2013 | Bax et al. |
| 2013/0339551 A1 | 12/2013 | Flanagan et al. |
| 2014/0105068 A1 | 4/2014 | Xu |
| 2015/0222705 A1 | 8/2015 | Stephens |
| 2015/0242134 A1 | 8/2015 | Takada et al. |
| 2016/0092136 A1 | 3/2016 | Balakrishnan et al. |
| 2016/0117113 A1 | 4/2016 | Li et al. |
| 2016/0335003 A1 | 11/2016 | Ahmed et al. |
| 2017/0235507 A1 | 8/2017 | Sinha et al. |
| 2018/0189635 A1 | 7/2018 | Olarig et al. |
| 2018/0197156 A1* | 7/2018 | Beesley ................. H04M 15/66 |
| 2018/0253256 A1 | 9/2018 | Bharadwaj |
| 2018/0317101 A1 | 11/2018 | Koue |
| 2019/0095299 A1 | 3/2019 | Liu et al. |
| 2019/0108888 A1 | 4/2019 | Sarkar et al. |
| 2019/0334987 A1 | 10/2019 | Mallick et al. |
| 2020/0021653 A1 | 1/2020 | Rao et al. |
| 2020/0097203 A1 | 3/2020 | Mallick et al. |
| 2020/0106698 A1 | 4/2020 | Rao et al. |
| 2020/0110552 A1 | 4/2020 | Kumar et al. |
| 2020/0112608 A1 | 4/2020 | Patel et al. |
| 2020/0192588 A1 | 6/2020 | Kumar et al. |
| 2020/0204475 A1 | 6/2020 | Mallick et al. |
| 2020/0204495 A1 | 6/2020 | Mallick et al. |
| 2020/0213274 A1 | 7/2020 | Pusalkar et al. |
| 2020/0241890 A1 | 7/2020 | Mallick et al. |
| 2020/0314218 A1 | 10/2020 | Kumar et al. |
| 2020/0348860 A1 | 11/2020 | Mallick et al. |
| 2020/0348861 A1 | 11/2020 | Marappan et al. |
| 2020/0348869 A1 | 11/2020 | Gokam |
| 2020/0349094 A1 | 11/2020 | Smith et al. |
| 2020/0363985 A1 | 11/2020 | Gokam et al. |
| 2020/0372401 A1 | 11/2020 | Mallick et al. |
| 2021/0019054 A1 | 1/2021 | Anchi et al. |
| 2021/0026551 A1 | 1/2021 | Tidke et al. |
| 2021/0026650 A1 | 1/2021 | Rao et al. |
| 2021/0157502 A1 | 5/2021 | Rao et al. |
| 2021/0181965 A1 | 6/2021 | Anchi et al. |
| 2021/0203595 A1* | 7/2021 | Rao ......................... H04L 45/02 |
| 2021/0279070 A1* | 9/2021 | Shaw ................. G06F 16/1824 |
| 2021/0349647 A1* | 11/2021 | Kanjirathinkal ........ G06F 3/067 |
| 2022/0171538 A1* | 6/2022 | Charles .................... G06F 3/061 |
| 2023/0236767 A1* | 7/2023 | Karr ........................ G06F 3/067 711/100 |
| 2023/0236768 A1* | 7/2023 | Patil ...................... G06F 3/0611 |

OTHER PUBLICATIONS

International Search Report and Written Opinion of PCT/US2019/053204 dated Dec. 16, 2019, 40 pages.

International Search Report and Written Opinion of PCT/US2019/053473 dated Dec. 19, 2019, 16 pages.

International Search Report and Written Opinion of PCT/US2019/067144 dated May 4, 2020, 26 pages.

Kris Piepho, "Dell EMC SC Series Storage: Microsoft Multipath I/O," Dell EMC Best Practices, Jan. 2017, 57 pages.

NVM Express, "NVM Express, Revision 1.3," NVM Express, May 1, 2017, 282 pages.

VMware, "Multipathing Configuration for Software iSCSI Using Port Binding," Technical White Paper, Apr. 25, 2012, 15 pages.

Dell EMC, "Dell EMC SC Series Storage: Microsoft Multipath I/O," Dell EMC Engineering, Jun. 2017, 56 pages.

Dell EMC, "Dell EMC PowerPath Family: PowerPath and PowerPath/VE Multipathing," Data Sheet, 2017, 3 pages.

EMC, "EMC PowerPath and PowerPath/VE Family for Windows," Installation and Administration Guide, Oct. 2018, 102 pages.

EMC, "EMC Powerpath Load Balancing and Failover", Comparison with native MPIO operating system solutions, Feb. 2011, 28 pages.

Dell EMC, "PowerMax OS," Dell EMC PowerMax Family Product Guide, May 2019, 192 pages.

Dell EMC, "Dell EMC SC Series Storage and Microsoft Multipath I/O," CML 1004, Jul. 2018, 36 pages.

VMware, Inc. "VMware VMFS Volume Management," 2009, 8 pages.

Dell EMC, "Dell EMC Unity: Virtualization Integration," Technical White Paper, Oct. 2019, 39 pages.

Dell EMC, "Dell EMC PowerMax: iSCSI Implementation for Dell EMC Storage Arrays Running PowerMaxOS," Technical White Paper, Sep. 2019, 35 pages.

(56) References Cited

OTHER PUBLICATIONS

NVM Express, "NVM Express Base Specification, Revision 2.0a," NVM Express, Jul. 23, 2021, 454 pages.
NVM Express, "NVM Express Base Specification, Revision 2.0b," NVM Express, Jan. 6, 2022, 455 pages.

* cited by examiner

STORAGE SYSTEM WITH EFFICIENT DATA PREFETCH FOR MULTIPLE STORAGE CONTROLLERS

FIELD

The field relates generally to information processing systems, and more particularly to storage in information processing systems.

BACKGROUND

Storage arrays and other types of storage systems are often shared by multiple host devices over a network. Applications running on the host devices each include one or more processes that perform the application functionality. The processes issue input-output (IO) operations directed to particular logical storage volumes or other logical storage devices, for delivery by the host devices over selected paths to storage ports of the storage system. Different ones of the host devices can run different applications with varying workloads and associated IO patterns. Such host devices also generate additional IO operations in performing various data services such as migration and replication. Various types of storage access protocols can be used by host devices to access the logical storage volumes or other logical storage devices of the storage system, including by way of example Small Computer System Interface (SCSI) access protocols and NVM Express (NVMe) access protocols. In these and other arrangements, a storage system may prefetch data of one or more logical storage devices from backend storage devices into an internal memory in order to reduce processing time for sequential IO operations. However, conventional prefetch arrangements can be problematic, particularly when used in combination with host-based path selection for adaptive load balancing.

SUMMARY

Illustrative embodiments disclosed herein provide techniques for efficient data prefetch in a storage system that includes multiple storage controllers. For example, some embodiments utilize interaction between the storage system and a multi-path layer of one or more host devices in order to control various aspects of data prefetch in the storage system. Such arrangements can, for example, significantly improve storage system performance by increasing the likelihood that sequential IO operations can be serviced from memory of the storage system rather than from backend storage devices of the storage system, particularly when the storage system includes multiple distinct storage controllers and the host device utilizes adaptive load balancing in selecting paths to the storage controllers.

In an illustrative embodiment, an apparatus comprises at least one processing device that includes a processor and a memory, with the processor being coupled to the memory. The at least one processing device is configured to receive in a storage system from at least one host device an indication of a data size utilized in a multi-path layer of the host device to select paths for delivery of IO operations to different storage controllers of the storage system. The at least one processing device is further configured to determine in the storage system a prefetch data size based at least in part on the data size indication received from the host device, and responsive to detection in the storage system of sequential data reads in IO operations received from the host device, to prefetch from one or more backend storage devices of the storage system, into a memory associated with a particular one of the storage controllers of the storage system, an amount of data that is determined based at least in part on the prefetch data size.

The at least one processing device illustratively comprises at least a portion of the storage system itself, such as at least one set of multiple directors or other storage controllers of a storage array or other type of storage system.

In some embodiments, at least a portion of the amount of data prefetched into the memory associated with the particular storage controller is subsequently transferred by the storage system into another memory associated with another one of the storage controllers.

The data size indication received from the host device in some embodiments comprises a particular data size value, such as, for example, an indication of a particular number of data blocks of at least one designated block size. The storage system in some embodiments may set the prefetch data size to the particular data size value. As another example, the storage system may set the prefetch data size based at least in part on a function of the particular data size value, such as a designated percentage of the particular data size value.

In some embodiments, the data size indication received from the host device specifies an amount of sequential read data after which at least one multi-path input-output (MPIO) driver of the host device will switch from sending IO operations over at least one path to one of the storage controllers of the storage system to sending IO operations over at least one path to another one of the storage controllers of the storage system.

The above-noted switching from sending IO operations over at least one path to one of the storage controllers to sending IO operations over at least one path to another one of the storage controllers in some embodiments is illustratively performed in some embodiments in accordance with an adaptive load balancing policy of the MPIO driver in which the other one of the storage controllers to which the MPIO driver will switch is unknown to the storage system prior to that switch.

In some embodiments, the storage system detects the sequential data reads in conjunction with receipt of IO operations directed to a first one of the storage controllers, and in response thereto prefetches an amount of data given by the prefetch data size into a first memory associated with the first storage controller.

The storage system in some embodiments subsequently detects additional sequential data reads in conjunction with receipt of IO operations directed to a second one of the storage controllers, and in response thereto transfers a remaining unread portion of the amount of data prefetched into the first memory associated with the first storage controller into a second memory associated with the second storage controller.

These and other illustrative embodiments include, without limitation, apparatus, systems, methods and computer program products comprising processor-readable storage media.

DETAILED DESCRIPTION

Illustrative embodiments will be described herein with reference to exemplary information processing systems and associated computers, servers, storage devices and other processing devices. It is to be appreciated, however, that these and other embodiments are not restricted to the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other cloud-based system that includes one or more clouds hosting multiple tenants that share cloud resources, as well as other types of systems comprising a combination of cloud and edge infrastructure. Numerous different types of enterprise computing and storage systems are also encompassed by the term "information processing system" as that term is broadly used herein.

Figure 1:
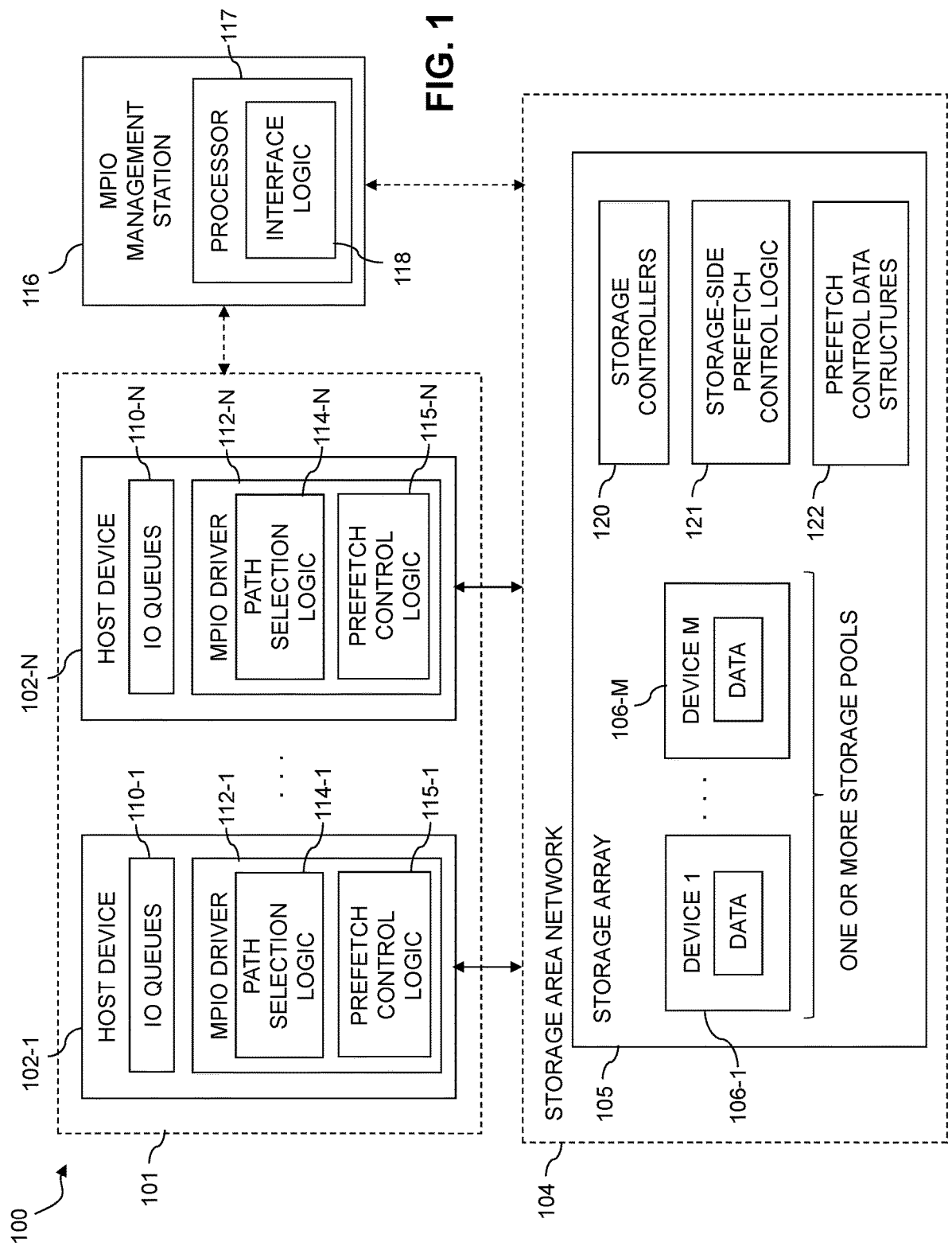
FIG. 1 is a block diagram of an information processing system configured with functionality for providing efficient data prefetch for multiple storage controllers in an illustrative embodiment.

FIG. 1 shows an information processing system 100 configured in accordance with an illustrative embodiment. The information processing system 100 comprises a computer system 101 illustratively comprising a plurality of host devices 102-1, . . . 102-N. The host devices 102 communicate over a storage area network (SAN) 104 with at least one storage array 105. The storage array 105 comprises a plurality of storage devices 106-1, . . . 106-M each storing data utilized by one or more applications running on one or more of the host devices 102. The storage devices 106 are illustratively arranged in one or more storage pools, and may be viewed as examples of what are more generally referred to in some embodiments as "backend storage devices" of a storage array.

The storage array 105 and its associated storage devices 106 are an example of what is more generally referred to herein as a "storage system." This storage system in the present embodiment is illustratively shared by the host devices 102. Other embodiments can include only a single host device, possibly configured to have exclusive use of the storage system.

In some embodiments, the storage array 105 more particularly comprises a distributed storage array that includes multiple storage nodes interconnected with one another, possibly in a mesh network arrangement. Such an arrangement is an example of what is more generally referred to herein as a "distributed storage system."

As will be described in more detail below, illustrative embodiments disclosed herein implement collaborative interaction between the host devices 102 and the storage array 105 to provide efficient data prefetch for multiple storage controllers of the storage array 105. Such arrangements can significantly increase the number of read hits for IO operations comprising sequential reads, thereby improving storage system performance.

The host devices 102 illustratively comprise respective computers, servers or other types of processing devices capable of communicating with the storage array 105 over the SAN 104. For example, at least a subset of the host devices 102 may be implemented as respective processing devices of a compute services platform or other type of processing platform. The host devices 102 in such an arrangement illustratively provide compute services such as execution of one or more applications on behalf of each of one or more users associated with respective ones of the host devices 102.

The term "user" herein is intended to be broadly construed so as to encompass numerous arrangements of human, hardware, software or firmware entities, as well as combinations of such entities.

Compute and/or storage services may be provided for users under a Platform-as-a-Service (PaaS) model, an Infrastructure-as-a-Service (IaaS) model, a Function-as-a-Service (FaaS) model and/or a Storage-as-a-Service (STaaS) model, although it is to be appreciated that numerous other cloud infrastructure arrangements could be used. Also, illustrative embodiments can be implemented outside of the cloud infrastructure context, as in the case of a stand-alone computing and storage system implemented within a given enterprise.

The storage devices 106 of the storage array 105 of SAN 104 implement logical units (LUNs) configured to store objects for users associated with the host devices 102. These objects can comprise files, blocks or other types of objects. The host devices 102 interact with the storage array 105 utilizing read and write commands as well as other types of commands that are transmitted over the SAN 104. Such commands in some embodiments more particularly comprise Small Computer System Interface (SCSI) commands of a SCSI access protocol and/or Non-Volatile Memory Express (NVMe) commands of an NVMe access protocol, although other types of commands can be used in other embodiments. A given IO operation as that term is broadly used herein illustratively comprises one or more such commands. References herein to terms such as "input-output" and "IO" should be understood to refer to input and/or output. Thus, an IO operation relates to at least one of input and output.

Also, the term "storage device" as used herein is intended to be broadly construed, so as to encompass, for example, a logical storage device such as a LUN or other logical storage volume. A logical storage device can be defined in the storage array 105 to include different portions of one or more physical storage devices. Storage devices 106 may therefore be viewed as comprising respective LUNs or other logical storage volumes.

Each of the host devices 102 illustratively has multiple paths to the storage array 105, with at least one of the storage devices 106 of the storage array 105 being visible to that host device on a given one of the paths. A given one of the storage devices 106 may be accessible to the given host device over multiple paths.

Different ones of the storage devices 106 of the storage array 105 illustratively exhibit different latencies in processing of IO operations. In some cases, the same storage device may exhibit different latencies for different ones of multiple paths over which that storage device can be accessed from a given one of the host devices 102.

The host devices 102, SAN 104 and storage array 105 in the FIG. 1 embodiment are assumed to be implemented using at least one processing platform each comprising one or more processing devices each having a processor coupled to a memory. Such processing devices can illustratively include particular arrangements of compute, storage and network resources. For example, processing devices in some embodiments are implemented at least in part utilizing virtual resources such as virtual machines (VMs) or Linux containers (LXCs), or combinations of both as in an arrangement in which Docker containers or other types of LXCs are configured to run on VMs.

The host devices 102 and the storage array 105 may be implemented on respective distinct processing platforms, although numerous other arrangements are possible. For example, in some embodiments at least portions of the host devices 102 and the storage array 105 are implemented on the same processing platform. The storage array 105 can therefore be implemented at least in part within at least one processing platform that implements at least a subset of the host devices 102.

The SAN 104 may be implemented using multiple networks of different types to interconnect storage system components. For example, the SAN 104 may comprise a portion of a global computer network such as the Internet, although other types of networks can be part of the SAN 104, including a wide area network (WAN), a local area network (LAN), a satellite network, a telephone or cable network, a cellular network, a wireless network such as a WiFi or WiMAX network, or various portions or combinations of these and other types of networks. The SAN 104 in some embodiments therefore comprises combinations of multiple different types of networks each comprising processing devices configured to communicate using Internet Protocol (IP) or other related communication protocols.

As a more particular example, some embodiments may utilize one or more high-speed local networks in which associated processing devices communicate with one another utilizing Peripheral Component Interconnect express (PCIe) cards of those devices, and networking protocols such as InfiniBand (IB), Gigabit Ethernet or Fibre Channel (FC). Numerous alternative networking arrangements are possible in a given embodiment, as will be appreciated by those skilled in the art.

The host devices 102 comprise respective sets of IO queues 110-1, . . . 110-N and respective MPIO drivers 112-1, . . . 112-N. The MPIO drivers 112 collectively comprise a multi-path layer of the host devices 102. Path selection functionality for delivery of IO operations from the host devices 102 to the storage array 105 is provided in the multi-path layer by respective instances of path selection logic 114-1, . . . 114-N implemented within the MPIO drivers 112. The multi-path layer further includes functionality for providing, in conjunction with collaboration between the host devices 102 and the storage array 105, efficient data prefetch for multiple storage controllers 120 of the storage array 105. Such functionality is provided at least in part using respective instances of prefetch control logic 115-1, . . . 115-N implemented within the MPIO drivers 112.

The MPIO drivers 112 may comprise, for example, otherwise conventional MPIO drivers, such as PowerPath® drivers from Dell Technologies, suitably modified in the manner disclosed herein to implement functionality for providing efficient data prefetch for the multiple storage controllers 120 of the storage array 105. Other types of MPIO drivers from other driver vendors may be suitably modified to incorporate functionality for providing efficient data prefetch for multiple storage controllers as disclosed herein. It is to be appreciated, however, that utilization of MPIO drivers in implementing such functionality is not required in other embodiments.

The host devices 102 can include additional or alternative components. For example, in some embodiments, the host devices 102 comprise respective local caches, implemented using respective memories of those host devices. A given such local cache can be implemented using one or more cache cards, or other suitable circuitry arrangements. A wide variety of different caching techniques can be used in other embodiments, as will be appreciated by those skilled in the art. Other examples of memories of the respective host devices 102 that may be utilized to provide local caches include one or more memory cards or other memory devices, such as, for example, an NVMe over PCIe cache card, a local flash drive or other type of NVM storage drive, or combinations of these and other host memory devices. Similar caching arrangements may be implemented in the storage array 105, utilizing memories implemented in or otherwise associated with the storage controllers 120.

The system 100 further comprises an MPIO management station 116 that includes a processor 117 implementing interface logic 118. The interface logic 118 is utilized to communicate with the host devices 102 and the storage array 105. Such an MPIO management station 116 provides management functionality for the multi-path layer comprising the MPIO drivers 112 of the host devices 102. In some embodiments, host device management software executing on the MPIO management station 116 interacts with storage array management software executing on the storage array 105. The MPIO management station 116, or portions thereof, may be considered in some embodiments as forming part of what is referred to herein as a "multi-path layer" that includes the MPIO drivers 112 of the host devices 102. The term "multi-path layer" as used herein is intended to be broadly construed and may comprise, for example, an MPIO layer or other multi-path software layer of a software stack, or more generally multi-pathing software program code, running on one or more processing devices each comprising at least one processor and at least one memory.

The MPIO management station 116 is an example of what is more generally referred to herein as an "external server" relative to the storage array 105. Additional or alternative external servers of different types can be used in other embodiments. In some embodiments, one or more external servers, such as the MPIO management station 116, can be configured to perform at least a portion of the functionality for providing efficient data prefetch for multiple storage controllers as disclosed herein. For example, the MPIO management station 116 can be configured to manage various aspects of the operation of the instances of prefetch control logic 115 of the respective MPIO drivers 112.

The MPIO driver 112-1 is configured to deliver IO operations selected from its corresponding set of IO queues 110-1 to the storage array 105 via selected ones of multiple paths over the SAN 104. The sources of the IO operations stored in the set of IO queues 110-1 illustratively include respective processes of one or more applications executing on the host device 102-1. For example, IO operations can be generated by each of multiple processes of a database application running on the host device 102-1. Such processes issue IO operations for delivery to the storage array 105 over the SAN 104. Other types of sources of IO operations may be present in a given implementation of system 100.

A given IO operation is therefore illustratively generated by a process of an application running on the host device 102-1, and is queued in a given one of the IO queues 110-1 of the host device 102-1 with other operations generated by other processes of that application, and possibly other processes of other applications.

The paths from the host device 102-1 to the storage array 105 illustratively comprise paths associated with respective initiator-target pairs, with each initiator comprising a single-port or multi-port host bus adaptor (HBA) or other initiating entity of the host device 102-1 and each target comprising a port or other targeted entity corresponding to one or more of the storage devices 106 of the storage array 105. As noted above, the storage devices 106 illustratively comprise LUNs or other types of logical storage devices. The HBAs may be viewed as examples of what are more generally referred to herein as "host ports."

In some embodiments, the paths are associated with respective communication links between the host device 102-1 and the storage array 105 with each such communication link having a negotiated link speed. For example, in conjunction with registration of a given HBA to a switch of the SAN 104, the HBA and the switch may negotiate a link speed. The actual link speed that can be achieved in practice in some cases is less than the negotiated link speed, which is a theoretical maximum value. A negotiated link speed is an example of what is more generally referred to herein as a "negotiated rate."

The negotiated rates of the respective initiator and target of a particular one of the paths illustratively comprise respective negotiated data rates determined by execution of at least one link negotiation protocol for that path. The link negotiation protocol is illustratively performed separately by the initiator and the target, and involves each such component separately interacting with at least one switch of a switch fabric of the SAN 104 in order to determine the negotiated rate, potentially leading to substantial mismatches in initiator and target negotiated rates for the same switch, set of switches or switch fabric of the SAN 104.

Negotiated rates of the respective particular initiator and the corresponding target illustratively comprise respective negotiated data rates determined by execution of at least one link negotiation protocol for an associated one of the paths.

In some embodiments, at least a portion of the initiators comprise virtual initiators, such as, for example, respective ones of a plurality of N-Port ID Virtualization (NPIV) initiators associated with one or more Fibre Channel (FC) network connections. Such initiators illustratively utilize NVMe arrangements such as NVMe/FC, although other protocols can be used. Other embodiments can utilize other types of virtual initiators in which multiple network addresses can be supported by a single network interface, such as, for example, multiple media access control (MAC) addresses on a single network interface of an Ethernet network interface card (NIC). Accordingly, in some embodiments, the multiple virtual initiators are identified by respective ones of a plurality of media MAC addresses of a single network interface of a NIC. Such initiators illustratively utilize NVMe arrangements such as NVMe/TCP, although again other protocols can be used.

In some embodiments, the NPIV feature of FC allows a single host HBA port to expose multiple World Wide Numbers (WWNs) to the SAN 104 and the storage array 105. A WWN or World Wide Identifier (WWID) is a unique identifier used in various types of storage technologies that may be implemented in illustrative embodiments herein, including, for example, SCSI, NVMe, FC, Parallel Advanced Technology Attachment (PATA), Serial Advanced Technology Attachment (SATA), Serial Attached SCSI (SAS) and others, and may be viewed as an example of what is more generally referred to herein as a virtual identifier. The NPIV feature is used, for example, when there are multiple IO producers on a given host device with a need to distinguish which IO is related to which producer.

One such case is a system in which multiple VMs run on a single ESXi server with HBAs. All VMs are using all HBAs but there is a need to be able to distinguish which IO belongs to which VM, for example, in order to implement different SLOs between the various VMs, illustratively at an OS level. Each of the NPIV initiators behaves as if it is a "normal" or physical initiator, in that it logs into a storage array port, requires masking, etc. Another example of NPIV usage is in the context of AIX servers, where different logical partitions each use a different NPIV initiator over the same host HBA port.

Accordingly, in some embodiments, multiple virtual initiators are associated with a single HBA of the host device 102-1 but have respective unique identifiers associated therewith.

Additionally or alternatively, different ones of the multiple virtual initiators are illustratively associated with respective different ones of a plurality of VMs of the host device that share a single HBA of the host device, or a plurality of logical partitions of the host device that share a single HBA of the host device.

Again, numerous alternative virtual initiator arrangements are possible, as will be apparent to those skilled in the art. The term "virtual initiator" as used herein is therefore intended to be broadly construed. It is also to be appreciated that other embodiments need not utilize any virtual initiators. References herein to the term "initiators" are intended to be broadly construed, and should therefore be understood to encompass physical initiators, virtual initiators, or combinations of both physical and virtual initiators.

Various host-side scheduling algorithms, load balancing algorithms and/or other types of algorithms can be utilized by the MPIO driver 112-1 in delivering IO operations from the IO queues 110-1 to the storage array 105 over particular paths via the SAN 104. Each such IO operation is assumed to comprise one or more commands for instructing the storage array 105 to perform particular types of storage-related functions such as reading data from or writing data to particular logical volumes of the storage array 105. Such commands are assumed to have various payload sizes associated therewith, and the payload associated with a given command is referred to herein as its "command payload."

A command directed by the host device 102-1 to the storage array 105 is considered an "outstanding" command until such time as its execution is completed in the viewpoint of the host device 102-1, at which time it is considered a "completed" command. The commands illustratively comprise respective SCSI commands, although other command formats can be used in other embodiments. A given such command is illustratively defined by a corresponding command descriptor block (CDB) or similar format construct. The given command can have multiple blocks of payload associated therewith, such as a particular number of 512-byte SCSI blocks or other types of blocks.

In illustrative embodiments to be described below, it is assumed without limitation that the initiators of a plurality of initiator-target pairs comprise respective ports of the host device 102-1 and that the targets of the plurality of initiator-target pairs comprise respective ports of the storage array 105. Examples of such host ports and storage array ports are illustrated in conjunction with the embodiment of FIG. 3.

Selecting a particular one of multiple available paths for delivery of a selected one of the IO operations of the set of IO queues 110-1 is more generally referred to herein as "path selection." Path selection as that term is broadly used herein can in some cases involve both selection of a particular IO operation and selection of one of multiple possible paths for accessing a corresponding logical device of the storage array 105. The corresponding logical device illustratively comprises a LUN or other logical storage volume to which the particular IO operation is directed.

It should be noted that paths may be added or deleted between the host devices 102 and the storage array 105 in the system 100. For example, the addition of one or more new paths from host device 102-1 to the storage array 105 or the deletion of one or more existing paths from the host device 102-1 to the storage array 105 may result from respective addition or deletion of at least a portion of the storage devices 106 of the storage array 105.

Addition or deletion of paths can also occur as a result of zoning and masking changes or other types of storage system reconfigurations performed by a storage administrator or other user. Some embodiments are configured to send a predetermined command from the host device 102-1 to the storage array 105, illustratively utilizing the MPIO driver 112-1, to determine if zoning and masking information has been changed. The predetermined command can comprise, for example, a log sense command, a mode sense command, a vendor unique command, or combinations of multiple instances of these or other commands, in an otherwise standardized storage access protocol command format.

In some embodiments, paths are added or deleted in conjunction with addition of a new storage array or deletion of an existing storage array from a storage system that includes multiple storage arrays, possibly in conjunction with configuration of the storage system for at least one of a migration operation and a replication operation.

For example, a storage system may include first and second storage arrays, with data being migrated from the first storage array to the second storage array prior to removing the first storage array from the storage system.

As another example, a storage system may include a production storage array and a recovery storage array, with data being replicated from the production storage array to the recovery storage array so as to be available for data recovery in the event of a failure involving the production storage array.

In these and other situations, path discovery scans may be repeated as needed in order to discover the addition of new paths or the deletion of existing paths.

A given path discovery scan can be performed utilizing known functionality of conventional MPIO drivers, such as PowerPath® drivers.

The path discovery scan in some embodiments may be further configured to identify one or more new LUNs or other logical storage volumes associated with the one or more new paths identified in the path discovery scan. The path discovery scan may comprise, for example, one or more bus scans which are configured to discover the appearance of any new LUNs that have been added to the storage array 105 as well to discover the disappearance of any existing LUNs that have been deleted from the storage array 105.

The MPIO driver 112-1 in some embodiments comprises a user-space portion and a kernel-space portion. The kernel-space portion of the MPIO driver 112-1 may be configured to detect one or more path changes of the type mentioned above, and to instruct the user-space portion of the MPIO driver 112-1 to run a path discovery scan responsive to the detected path changes. Other divisions of functionality between the user-space portion and the kernel-space portion of the MPIO driver 112-1 are possible. The user-space portion of the MPIO driver 112-1 is illustratively associated with an Operating System (OS) kernel of the host device 102-1. Other MPIO driver arrangements are possible. For example, in some embodiments, an MPIO driver may be configured using a kernel-based implementation, and in such an arrangement may include only a kernel-space portion and no user-space portion.

For each of one or more new paths identified in the path discovery scan, the host device 102-1 may be configured to execute a host registration operation for that path. The host registration operation for a given new path illustratively provides notification to the storage array 105 that the host device 102-1 has discovered the new path. Such host registration operations are illustratively part of a host registration process.

The MPIO management station 116 is arranged as an intermediary device relative to the host devices 102 and the storage array 105. Some communications between the host devices 102 and the storage array 105 can occur via such an intermediary device, which as indicated elsewhere herein can alternatively comprise one or more external servers. Such communications illustratively involve utilization of an out-of-band communication mechanism, such as one or more IP connections between the host devices 102 and the MPIO management station 116.

As indicated previously, the host devices 102 communicate directly with the storage array 105 using one or more storage access protocols such as SCSI, Internet SCSI (ISCSI), SCSI over FC (SCSI-FC), NVMe over FC (NVMe/FC), NVMe over Fabrics (NVMe-oF), NVMe over TCP (NVMe/TCP), and/or others. The MPIO management station 116 in some embodiments is similarly configured to communicate directly with the storage array 105 using one or more such storage access protocols.

The MPIO driver 112-1 on the host device 102-1 illustratively has connectivity to the MPIO management station 116. The MPIO management station 116 in some embodiments implements PowerPath® Management Appliance (PPMA) functionality to obtain access to the host devices 102 and the storage array 105. The MPIO driver 112-1 can obtain from the MPIO management station 116 certain types of storage array related information for use in various operations performed at least in part by the MPIO driver 112-1, in addition to or in place of obtaining such information directly from the storage array 105. Host multi-pathing software can be used to implement a multi-path layer comprising MPIO drivers 112 of respective host devices 102 as well as related management appliance software such as the above-noted PPMA of MPIO management station 116. Such host multi-pathing software can be configured to communicate with the storage array 105 to facilitate provision of efficient data prefetch for multiple storage controllers of the storage array 105 as disclosed herein.

As indicated previously, under conventional practice, a storage system may prefetch data of one or more logical storage devices from backend storage devices into an internal memory in order to reduce processing time for sequential IO operations. However, conventional prefetch arrangements can be problematic, particularly when used in combination with host-based path selection for adaptive load balancing. For example, such arrangements are problematic when the storage system comprises multiple storage controllers, as the particular manner in which a multi-path layer of one or more host devices will switch between the multiple storage controllers when performing adaptive load balancing is generally unknown to the storage system, thereby unduly complicating storage-side prefetch. This can cause the storage system to routinely prefetch either too much data or too little data, which reduces read hits and tends to undermine storage system performance for sequential reads.

Illustrative embodiments disclosed herein provide techniques for efficient data prefetch in a storage system that includes multiple storage controllers. For example, some embodiments utilize interaction between the storage system and a multi-path layer of one or more host devices in order to control various aspects of data prefetch in the storage system. Such arrangements can, for example, significantly improve storage system performance by increasing the likelihood that sequential IO operations can be serviced from memory of the storage system rather than from backend storage devices of the storage system, particularly when the storage system includes multiple distinct storage controllers and the host device utilizes adaptive load balancing in selecting paths to the storage controllers.

In the FIG. 1 embodiment, the storage array 105 comprises a plurality of storage controllers 120, storage-side prefetch control logic 121, and one or more prefetch control data structures 122 for storing information relating to prefetch data sizes in the storage array 105. In other embodiments, at least portions of one or more of the storage-side prefetch control logic 121 and the prefetch control data structures 122 can be implemented at least in part external to the storage array 105 rather than internal to the storage array 105. For example, in some embodiments at least portions of the storage-side prefetch control logic 121 and prefetch control data structures 122 are implemented on one or more servers that are external to the storage array 105.

Accordingly, such logic components and related stored information may be located internal to the storage array 105, external to the storage array 105, or implemented in part internally and in part externally to the storage array 105, and can include various combinations of hardware, firmware and software. The term "logic" as used herein is therefore intended to be broadly construed.

As indicated above, at least portions of the communications between the host devices 102 and the storage array 105 can utilize an in-band communication mechanism in which one or more predetermined commands in a designated storage access protocol are sent from the host device 102-1 to the storage array 105. Such predetermined commands can comprise, for example, read and/or write commands, sense commands (e.g., log select, mode select, log sense and/or mode sense commands), vendor unique commands, or combinations of multiple instances of these or other commands, in an otherwise standardized command format, such as a SCSI format, an NVMe format, or other type of format. A "command" as the term is broadly used herein can comprise a combination of multiple distinct commands.

It is also possible for the host devices 102 and the storage array 105 to communicate via one or more out-of-band communication mechanisms. For example, an out-of-band communication mechanism of this type can involve host management software of the host device 102-1 communicating with storage array management software of the storage array 105 over an IP network connection or other type of network connection. Such host management software can include software running on the MPIO management station 116, in addition to or in place of software running on the individual host devices 102.

Additional components not explicitly shown in the figure, such as one or more storage caches or other internal memories, may also be provided in the storage array 105 for use in processing IO operations. For example, in some embodiments, each of the storage controllers 120 has a different local cache or a different allocated portion of a global cache associated therewith, although numerous alternative arrangements are possible. Such local caches or different allocated portions of a global cache are examples of what are referred to herein as respective "memories" of the storage controllers 120. In some embodiments, such memories may be collectively referred to as "read memory" of the storage array 105.

Other types of memories may be associated with the respective storage controllers 120 in other embodiments, and such memories may be internal to the storage controllers 120, external to the storage controllers 120, or partially internal and partially external to the storage controllers 120. Such memories in some embodiments are coupled together via a high-speed network, such as an InfiniBand backbone network or other arrangement of interconnects configured to facilitate rapid transfer of data between the memories in conjunction with efficient data prefetch as disclosed herein. The storage controllers 120 can be implemented as respective storage processors, directors or other storage system components configured to control storage system operations relating to processing of IO operations.

Although in some embodiments certain commands used by the host devices 102 to communicate with the storage array 105 illustratively comprise SCSI commands, other types of commands and command formats can be used in other embodiments. For example, some embodiments can implement IO operations utilizing command features and functionality associated with NVMe, as described in the NVM Express Base Specification, Revision 2.0c, October 2022, and its associated NVM Express Command Set Specification and NVM Express TCP Transport Specification, all of which are incorporated by reference herein. Other examples of NVMe storage access protocols that may be utilized in illustrative embodiments disclosed herein include NVMe over Fibre Channel, also referred to herein as NVMe/FC, NVMe over Fabrics, also referred to herein as NVMe-oF, and NVMe over TCP, also referred to herein as NVMe/TCP. Other embodiments can utilize other types of storage access protocols, such as the iSCSI protocol.

The storage array 105 in the present embodiment is assumed to comprise one or more internal memories that are implemented using a flash memory or other type of non-volatile memory of the storage array 105. More particular examples include NAND-based flash memory or other types of non-volatile memory such as resistive RAM, phase change memory, and spin torque transfer magneto-resistive RAM (STT-MRAM). The internal memories are further assumed to be separate from the storage devices 106 of the storage array 105 in some embodiments. However, the storage devices 106 may comprise flash-based storage devices, as in embodiments involving all-flash storage arrays, or may be implemented in whole or in part using other types of non-volatile memory.

In some embodiments, the storage devices 106 more particularly comprise respective backend storage devices of the storage array 105, as distinguished from memories of the storage array 105, such as memories comprising respective caches of the storage controllers 120. Terms such as "backend storage device" and "memory" as used herein are intended to be broadly construed, so as to encompass these and other arrangements.

The storage array 105 in the present embodiment may comprise additional components not explicitly shown in the figure, such as a response time control module and IO operation priority queues, illustratively configured to make use of corresponding portions of the above-described internal memories. For example, the response time control module may be used to implement storage array based adjustments in response time for particular IO operations based at least in part on service level objective (SLO) information stored by the storage array 105 in a given one of its internal memories. The response time control module is assumed to operate in conjunction with the above-noted IO operation priority queues.

The storage array 105 illustratively utilizes its IO operation priority queues to provide different levels of performance for IO operations. For example, the IO operation priority queues may have respective different priority levels. The storage array 105 may be configured to provide different priority levels for different ones of the IO operations by assigning different ones of the IO operations to different ones of the IO operation priority queues. The IO operation priority queues are illustratively associated with respective SLOs for processing of IO operations in the storage array 105.

As another illustration, in some embodiments, the IO operation priority queues are implemented as respective SLO-based queues. For example, the SLO-based queues illustratively may have respective different SLO levels, such as Diamond, Gold, Silver and Bronze, in this example arranged from a highest SLO to a lowest SLO, with higher SLOs having better response times than lower SLOs. The storage array 105 may be configured to provide different SLOs for different ones of the IO operations by assigning different ones of the IO operations to different ones of the SLO-based queues. The SLO-based queues are illustratively associated with respective SLOs for processing of IO operations in the storage array 105.

In these and other embodiments, process tags may be used in assigning different ones of the IO operations to different ones of the SLO-based queues or other IO operation priority queues of the storage array 105, as disclosed in U.S. Pat. No. 10,474,367, entitled "Storage System with Input-Output Performance Control Utilizing Application Process Detection," which is incorporated by reference herein. However, use of process tags is not required, and other techniques can be used to assign particular IO operations received in the storage array 105 to particular ones of the IO operation priority queues.

As mentioned above, communications between the host devices 102 and the storage array 105 may utilize PCIe connections or other types of connections implemented over one or more networks, using interfaces and protocols as previously described. Numerous other interfaces and associated protocols can be used in other embodiments.

The storage array 105 in some embodiments may be implemented as part of cloud infrastructure in the form of a cloud-based system. Such a cloud-based system can additionally or alternatively be used to implement other portions of system 100, such as the host devices 102 and the MPIO management station 116.

The storage devices 106 of the storage array 105 can be implemented using solid state drives (SSDs). Such SSDs are implemented using non-volatile memory (NVM) devices such as flash memory. Other types of NVM devices that can be used to implement at least a portion of the storage devices 106 include non-volatile random access memory (NVRAM), phase-change RAM (PC-RAM) and magnetic RAM (MRAM). These and various combinations of multiple different types of NVM devices or other storage devices may also be used. For example, hard disk drives (HDDs) can be used in combination with or in place of SSDs or other types of NVM devices. Accordingly, numerous other types of electronic or magnetic media can be used in implementing at least a subset of the storage devices 106.

The storage array 105 may additionally or alternatively be configured to implement multiple distinct storage tiers of a multi-tier storage system. By way of example, a given multi-tier storage system may comprise a fast tier or performance tier implemented using flash storage devices or other types of SSDs, and a capacity tier implemented using HDDs, possibly with one or more such tiers being server based. A wide variety of other types of storage devices and multi-tier storage systems can be used in other embodiments, as will be apparent to those skilled in the art. The particular storage devices used in a given storage tier may be varied depending on the particular needs of a given embodiment, and multiple distinct storage device types may be used within a single storage tier. As indicated previously, the term "storage device" as used herein is intended to be broadly construed, and so may encompass, for example, SSDs, HDDs, flash drives, hybrid drives or other types of storage products and devices, or portions thereof, and illustratively include logical storage devices such as LUNs.

As another example, the storage array 105 may be used to implement one or more storage nodes in a distributed storage system comprising a plurality of storage nodes interconnected by one or more networks.

It should therefore be apparent that the term "storage array" as used herein is intended to be broadly construed, and may encompass multiple distinct instances of a commercially-available storage array.

Other types of storage products that can be used in implementing a given storage system in illustrative embodiments include software-defined storage, cloud storage, object-based storage and scale-out storage. Combinations of multiple ones of these and other storage types can also be used in implementing a given storage system in an illustrative embodiment.

In some embodiments, a storage system comprises first and second storage arrays arranged in an active-active configuration. For example, such an arrangement can be used to ensure that data stored in one of the storage arrays is replicated to the other one of the storage arrays utilizing a synchronous replication process. Such data replication across the multiple storage arrays can be used to facilitate failure recovery in the system 100. One of the storage arrays may therefore operate as a production storage array relative to the other storage array which operates as a backup or recovery storage array.

It is to be appreciated, however, that embodiments disclosed herein are not limited to active-active configurations or any other particular storage system arrangements. Accordingly, illustrative embodiments herein can be configured using a wide variety of other arrangements, including, by way of example, active-passive arrangements, active-active arrangements, Asymmetric Logical Unit Access and/or Asymmetric Namespace Access (ALUA/ANA) arrangements, etc.

These and other storage systems can be part of what is more generally referred to herein as a processing platform comprising one or more processing devices each comprising a processor coupled to a memory. A given such processing device may correspond to one or more virtual machines or other types of virtualization infrastructure such as Docker containers or other types of LXCs. As indicated above, communications between such elements of system 100 may take place over one or more networks.

The term "processing platform" as used herein is intended to be broadly construed so as to encompass, by way of illustration and without limitation, multiple sets of processing devices and one or more associated storage systems that are configured to communicate over one or more networks. For example, distributed implementations of the host devices 102 are possible, in which certain ones of the host devices 102 reside in one data center in a first geographic location while other ones of the host devices 102 reside in one or more other data centers in one or more other geographic locations that are potentially remote from the first geographic location. Thus, it is possible in some implementations of the system 100 for different ones of the host devices 102 to reside in different data centers than the storage array 105.

Numerous other distributed implementations of the host devices 102 and/or the storage array 105 are possible. Accordingly, the storage array 105 can also be implemented in a distributed manner across multiple data centers.

It is to be appreciated that these and other features of illustrative embodiments are presented by way of example only, and should not be construed as limiting in any way. Accordingly, different numbers, types and arrangements of system components such as host devices 102, SAN 104, storage array 105, storage devices 106, sets of IO queues 110, and MPIO drivers 112, including their corresponding instances of path selection logic 114 and prefetch control logic 115, can be used in other embodiments.

It should also be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

As indicated above, illustrative embodiments overcome various drawbacks of conventional practice by configuring the system 100 to include functionality for providing efficient data prefetch for multiple storage controllers of the storage array 105, through collaboration between storage array 105 and the host devices 102, as will now be described in more detail.

In operation, the MPIO driver 112-1 is configured to control delivery of IO operations from its corresponding host device 102-1 to storage array 105 over selected ones of a plurality of paths through SAN 104, using its path selection logic 114-1, where the paths are associated with respective initiator-target pairs, the initiators being implemented on the host device 102-1 and the targets being implemented on the storage array 105. The MPIO driver 112-1 in this embodiment is further configured to send to the storage array 105 over the SAN 104 an indication of a data size utilized by the MPIO driver 112-1 to select paths for delivery of IO operations to different ones of the storage controllers 120 of the storage array 105.

For example, the data size indication provided by the MPIO driver 112-1 to the storage array 105 illustratively specifies an amount of sequential read data after which the MPIO driver 112-1 will switch from sending IO operations over at least one path to one of the storage controllers 120 of the storage array 105 to sending IO operations over at least one path to another one of the storage controllers 120 of the storage array 105. Other data size indications can be used in other embodiments, and the term "data size indication" as used herein is therefore intended to be broadly construed, so as to encompass, for example, data size values and other types of information characterizing an amount of read data after which the MPIO driver 112-1 will switch from one storage controller to another storage controller, illustratively in accordance with a load balancing algorithm.

The switching from sending IO operations over at least one path to one of the storage controllers 120 to sending IO operations over at least one path to another one of the storage controllers 120 is illustratively performed in accordance with an adaptive load balancing policy of the MPIO driver 112-1, in which the other one of the storage controllers to which the MPIO driver will switch is unknown to the storage array 105 prior to that switch.

As indicated previously, the storage controllers 120 can be implemented as respective storage processors, directors or other storage system components configured to control storage system operations relating to processing of IO operations. The term "storage controller" as used herein is therefore intended to be broadly construed. A given storage controller may comprise multiple storage ports or other targets, each associated with a different path over with the MPIO driver 112-1 can communicate with that target. The storage controller itself, or a portion thereof, may be considered a "target" of a given path in some embodiments.

The above-noted data size indications are illustratively sent from the MPIO driver 112-1 of the host device 102-1 to the storage array 105 in one or more commands, such as, for example, log select, mode select and/or vendor unique commands, although any of a wide variety of other types of commands can be used to convey the data size indications in other embodiments. Such commands will generally vary in terms of format and content depending upon the particular storage access protocol utilized by the host devices 102 to communicate with the storage array 105, such as a SCSI access protocol or an NVMe access protocol.

The storage array 105 receives the data size indication sent by the host device 102-1 via the MPIO driver 112-1 and determines a prefetch data size based at least in part on the received data size indication. In some embodiments, the data size indication received from the host device 102-1 comprises a particular data size value, such as, for example, an indication of a particular number of data blocks of at least one designated block size. As indicated above, a wide variety of other types of data size indications can be used in other embodiments.

In some embodiments, the storage array 105 determines the prefetch data size by simply setting the prefetch data size to the particular data size value conveyed to the storage array 105 by the host device 102-1. In such an arrangement, the prefetch data size in the storage array 105 is set to the particular data size value, such that both the prefetch data size and the particular data size value are the same. Alternatively, the prefetch data size can be determined in the storage array 105 at least in part as a function of the particular data size value, such as, for example, a designated percentage of the particular data size value (e.g., 90% of the data size value, 80% of the data size value, etc.)

Figure 4:
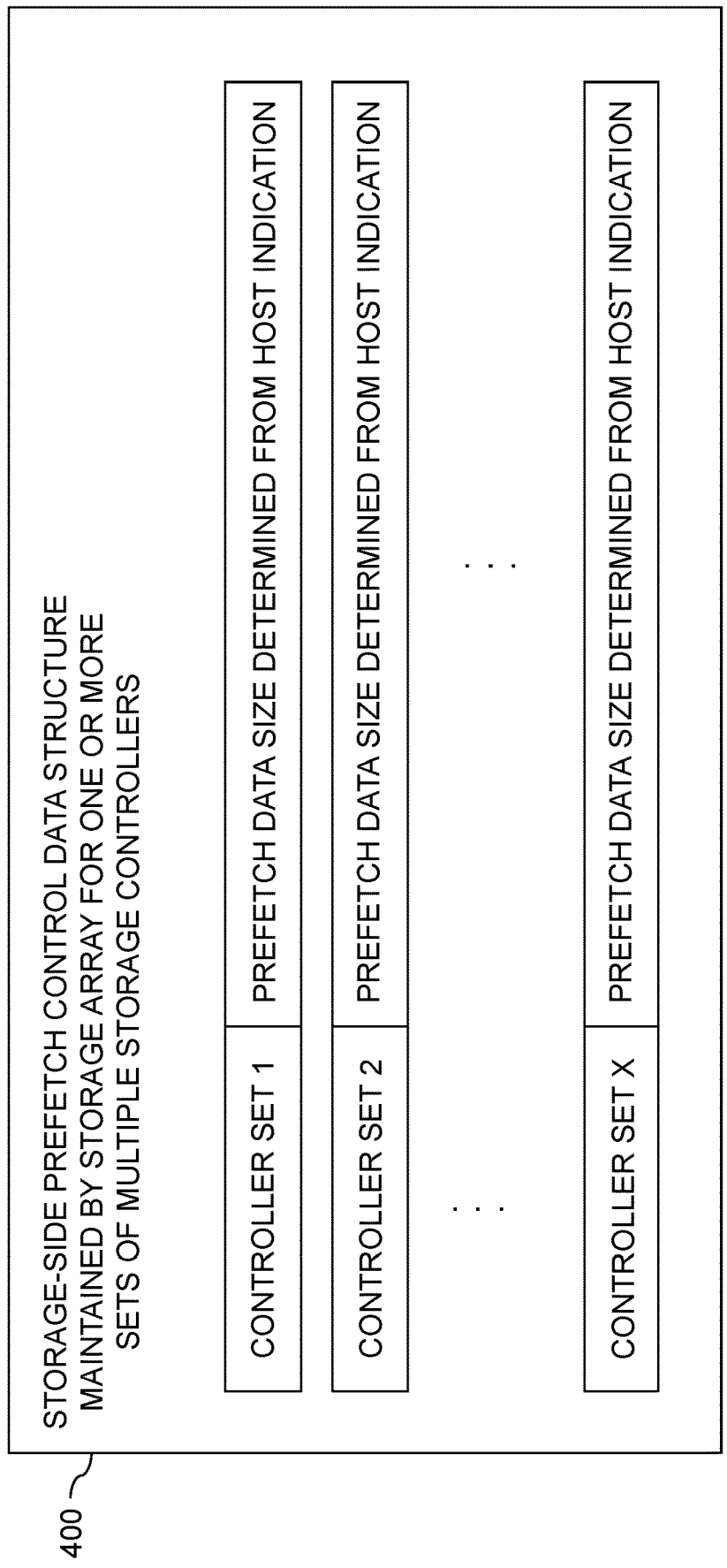
FIG. 4 shows an example data structure utilized in providing efficient data prefetch for multiple storage controllers in an illustrative embodiment.

The prefetch data size may be stored in association with an identifier of a set of storage controllers in at least one of the prefetch control data structures 122 of the storage array 105. An example of such a data structure is shown in FIG. 4, but numerous other types and arrangements of one or more data structures can be used.

The storage array 105, responsive to detection in the storage array 105 of sequential data reads in IO operations received from the MPIO driver 112-1 of the host device 102-1, prefetches from one or more storage devices 106 of the storage array, into a memory associated with a particular one of the storage controllers 120 of the storage system, an amount of data that is determined based at least in part on the prefetch data size. The amount of prefetched data illustratively comprises the particular amount of data given by the prefetch data size, although other arrangements are possible.

In some embodiments, the storage array 105 detects the sequential data reads in conjunction with receipt of IO operations directed to a first one of the storage controllers 120, and in response thereto prefetches an amount of data given by the prefetch data size into a first memory associated with the first storage controller.

The storage array 105 then subsequently detects additional sequential data reads in conjunction with receipt of IO operations directed to a second one of the storage controllers 120, and in response thereto transfers a remaining unread portion of the amount of data previously prefetched into the first memory associated with the first storage controller into a second memory associated with the second storage controller. The "unread portion" of the previously-prefetched amount of data illustratively comprises a portion of that amount of data that has not been read by 10 the MPIO driver 112-1 from the first storage controller, and will not be read from that storage controller as the MPIO driver 112-1 has switched to the second storage controller before reading all of the previously-prefetched amount of data from the first storage controller.

The above-described efficient data prefetch functionality is illustratively carried out at least in part by cooperative interaction of the host device 102-1 and the storage array 105 utilizing their respective instances of prefetch control logic 115-1 and 121.

The other host devices 102 are assumed to operate in a manner similar to that described above for host device 102-1 via their respective instances of MPIO drivers 112 and corresponding path selection logic 114 and prefetch control logic 115.

The storage array 105 is an example of what is more generally referred to herein as "at least one processing device" comprising a processor and a memory, with the processor being coupled to the memory. References herein to "at least one processing device" can additionally or alternatively include at least a portion of one or more of the host devices 102. Other types and arrangements of one or more processing devices can be used to implement efficient data prefetch functionality as disclosed herein.

For example, the storage array 105 can illustratively include multiple sets of one or more processing devices, with each such set corresponding to a different distributed storage node. Each such additional processing device also includes a processor and a memory coupled to the processor, with the additional processing devices being implemented in the respective distributed storage nodes of the storage array 105 and configured to perform at least a portion of the efficient data prefetch functionality for multiple controllers as disclosed herein.

These and other illustrative embodiments disclosed herein include functionality for providing efficient data prefetch for multiple storage controllers, with at least portions of that functionality being implemented using one or more MPIO drivers of a multi-path layer of at least one host device. The MPIO drivers can comprise PowerPath® drivers suitably modified to implement the techniques disclosed herein. Other types of host multi-pathing software from other vendors can be similarly modified to implement the techniques disclosed herein. Again, MPIO drivers are not required, and other types of host drivers or more generally other host device components can be used to interact with a storage array 105 in implementing the disclosed efficient data prefetch for multiple storage controllers.

An example of an algorithm performed by one or more of the host devices 102 and the storage array 105 in implementing efficient data prefetch for multiple storage controllers will now be described in more detail.

As indicated previously, under typical conventional practice, storage arrays can be configured to prefetch data from backend storage devices when detecting sequential read operations from a host device. A given such storage array will usually detect that some of the read commands are targeting a sequential address range, and then, based on the sequential stream size, decide how much data to prefetch so that subsequent read commands of the sequential stream will be read hits, as the data is already pre-fetched to read memory of the storage array, where the read memory is an example of what is more generally referred to herein as an internal memory of the storage array.

The amount of data to be pre-fetched can be determined based at least in part on how many read commands have been received to a sequential address space. For example, if the storage array receives ten read commands (e.g., 8K reads) aimed at a sequential logical block address (LBA) range, the storage array may prefetch the next 128K of data from the backend storage devices and into read memory in order to improve the response time of subsequent read commands, assuming the sequential stream continues.

This conventional approach can be problematic in many typical storage system arrangements. For example, an overly aggressive prefetch can result in too much data being prefetched, which can undermine storage array performance.

As described above, illustrative embodiments disclosed herein overcome these and other drawbacks of conventional practice by providing techniques for efficient prefetch for multiple storage controllers. Such storage controllers are referred to in some description below as simply "controllers" for simplicity.

In a multi-controller storage array, it is desirable to prefetch data to the controller to which the host device is sending the read commands. The data may reside on any controller as the memory is typically allocated among the controllers. Accordingly, when a read command arrives at one controller the data itself may reside on another controller. This is still considered a read hit because the data is in read memory of the storage array, even though on a different controller, and therefore will not need to be read from backend storage devices. Inter-controller data transfer is typically performed via a high-speed network and is significantly faster than reading data from the backend storage devices.

In some embodiments, an MPIO driver is configured to detect streaming sequential IOs. When such sequential access is detected, the MPIO driver will send a particular number of read commands to a particular controller on a given path with the assumption that the storage array will prefetch the data into the memory of the controller associated with this path. The MPIO driver may send read commands for a particular number X of data blocks over that path, where X is a configurable parameter, and then switch to sending the read commands over a different path to different controller in accordance with a load balancing policy. In some embodiments, the next path is determined using a fixed round robin policy, although other policies, including adaptive load balancing policies, can also be used.

Assuming Y is the amount of data ("data size") being prefetched by the storage array, and X is the data size after which the MPIO will swap paths as described above, if Y>X then at least some of the data is being prefetched to a controller that will not receive at least some of the read commands, as the MPIO driver swaps paths after reading a data size of X blocks.

In some embodiments, the MPIO driver is configured to send to the storage array, via a log select, mode select, or other type of command, an indication of the data size X, which as noted above may be expressed in terms of a number of data blocks, such as X=50 data blocks, after which it will swap controllers to which it sends sequential reads. The storage array responds to this indication by limiting the amount of data it prefetches to the memory of a given controller to the data size X, such as 50 data blocks.

In some embodiments, the MPIO driver uses an adaptive load balancing policy to select the next path for the sequential streaming of read commands. For example, the MPIO driver can send a particular number N of IOs on the specific path to one controller before switching to the next path to another controller.

In some embodiments, the MPIO driver may send an indication to the storage array about the next path on which it plans to send sequential read commands. This indication can be generated by defining a threshold number (T) which is less than N. When the MPIO driver completes the threshold number T of sequential read commands it will calculate the adaptive weight of all the paths and indicate to the storage array the next path that it plans to use for the sequential read stream. This hint can be sent to the storage array using a mode select command or another type of command, and will help the storage array to prefetch the next set of data blocks on the appropriate controller. It should be noted that other embodiments need not provide any hint or other indication regarding the next path to the storage array. Such embodiments may instead just provide a hint or other indication as to the value of X.

As indicated above, the MPIO driver is illustratively configured to swap paths after X blocks have been read. The storage array will detect the controller to which the next sequential read commands will be sent and will prefetch another X blocks into that controller.

An illustrative embodiment includes an algorithm with the following steps, illustratively carried out through collaborative interaction between prefetch control logic instances of host devices 102-1 and storage array 105, although additional or alternative steps can be used in other embodiments, and the ordering of the steps can be varied. For example, although shown in serial order, at least some of the steps can be performed at least in part in parallel with other ones of the steps.

In this example algorithm, it is assumed that an MPIO driver of a host device is reading data from an LBA range 1 to 1000 of a logical storage device D that is masked to four distinct directors of a storage array. The directors are denoted as director 1, director 3, director 5 and director 7. Such directors are considered examples of what are more generally referred to herein as respective "storage controllers" of the storage array, and other types of storage controllers can be used in other embodiments. A given storage array can include, for example, 16 directors in some embodiments, although different numbers of directors or other storage controllers can be used in other embodiments.

Further assume that the MPIO driver swaps paths after reading a predetermined number of blocks, denoted by a configurable parameter X, where X=50 for the present example. More particularly, the MPIO driver reads 50 blocks from one director and then reads the next 50 blocks from another director, and so on in a potentially random sequence determined by adaptive load balancing in the MPIO driver. It is also assumed for simplicity that 50 blocks are read with a single read command. The MPIO driver issues read commands to read respective sets of 50 blocks from different ones of the directors. As indicated above, the order in which the MPIO driver reads from particular ones of the drivers in some embodiments may be dynamic and unpredictable in the presence of adaptive load balancing, and is therefore not apparent in advance to the storage array. However, to illustrate the operation of the example algorithm, it is assumed that the MPIO driver at least initially moves from director to director in the order 1, 3, 5, 7, 1, 3, 5, 7 . . . and so on. The example algorithm then proceeds in the following manner.

1. The MPIO driver initially sends a first read command to director 1 to read 50 blocks from LBAs 1 to 50, denoted blocks 1 to 50, then sends a second read command to director 3 to read 50 blocks from LBAs 51 to 100, denoted blocks 51 to 100, and then sends a third read command to director 5 to read 50 blocks from LBAs 101 to 150, denoted blocks 101 to 150. For simplicity, the LBA of a given block will similarly be used to identify that particular block in the following steps.

2. The storage array detects the above-noted sequential read while processing block 110 at director 5. Responsive to detecting the sequential read, the storage array prefetches X=50 additional blocks 111 through 160 from backend storage devices into a memory of director 5, where the value of X in this embodiment was previously sent by the MPIO driver to the storage array in a mode select command. Other types of commands or techniques can be used to convey the current value of the configurable parameter X from the MPIO driver to the storage array. The storage array knows that the MPIO driver will switch after 50 blocks to another director but does not know which other director.

3. The MPIO driver finishes reading blocks 101 to 150 from director 5 and sends a fourth read command to director 7 to read blocks 151 through 200. Blocks 151 through 160 remain prefetched in the memory of director 5 but are not yet accessed by the MPIO driver.

4. The storage array moves blocks 151 through 160 from the memory of director 5 to the memory of director 7, and prefetches 50 additional blocks 161 through 210 into the memory of director 7. The read of blocks 151 through 160 is considered a read hit as those blocks were already in memory in the storage array, although in the memory of a different director, and therefore do not have to be retrieved from backend storage devices. Blocks 151 through 200 are provided to the MPIO driver in response to the fourth read command sent to director 7. It is assumed that the memories of the various directors are coupled together via a high-speed communication path, such as an InfiniBand network, such that prefetched blocks can be transferred rapidly between their respective memories. At this point there are still ten blocks, blocks 201 through 210, that are prefetched into the memory of director 7.

5. The MPIO driver finishes reading blocks 151 to 200 from director 7 and sends a fifth read command to director 1 to read blocks 201 through 250. As noted above, blocks 201 through 210 remain prefetched in the memory of director 7 but have not yet been accessed by the MPIO driver.

6. The storage array moves blocks 201 through 210 from the memory of director 7 to the memory of director 1, and prefetches 50 additional blocks 211 through 260 into the memory of director 1. The read of blocks 201 through 210 is considered a read hit as those blocks were already in memory in the storage array, although in the memory of a different director, and therefore do not have to be retrieved from backend storage devices. Blocks 201 through 250 are provided to the MPIO driver in response to the fifth read command sent to director 1. At this point there are still ten blocks, blocks 251 through 260, that are prefetched into the memory of director 1.

7. The MPIO driver finishes reading blocks 201 to 250 from director 1 and sends a sixth read command to director 3 to read blocks 251 through 300. As noted above, blocks 251 through 260 remain prefetched in the memory of director 1 but have not yet been accessed by the MPIO driver. The algorithm continues with the storage array moving blocks 251 through 260 from the memory of director 1 to the memory of director 3, prefetching blocks 261 through 310 into the memory of director 1, and providing blocks 251 through 300 to the MPIO driver in response to the sixth read command sent to director 3, and so on in a similar manner for additional steps of the algorithm.

This example algorithm provides significantly improved performance by increasing the likelihood of read hits for sequential read commands, while also preventing the storage array from prefetching too much data. The algorithm is configured to allow the storage array to prefetch into the memory of a given controller just enough data to service the read commands from memory of the given controller while also moving any remaining prefetched blocks from the memory of the given controller to a memory of the next controller. The data size or number of data blocks X is a configurable parameter that may be set by an administrator or other user.

It is apparent from the foregoing that illustrative embodiments provide significant advantages over conventional practice. For example, these embodiments provide efficient data prefetching techniques that leverage collaboration between a host and a storage array.

Such arrangements can, for example, increase the likelihood that sequential IO operations can be serviced from memory of the storage system rather than from backend storage devices of the storage system.

As a result, IO processing performance is significantly improved, and the storage system can more easily meet performance goals.

The disclosed techniques are particularly advantageous for situations in which the storage system includes multiple distinct storage controllers and the host device utilizes adaptive load balancing in selecting paths to the storage controllers.

The multi-pathing software portions of example techniques described above may be similarly performed by a given MPIO driver on a corresponding host device, and similarly by other MPIO drivers on respective other host devices. Such MPIO drivers illustratively form a multi-path layer comprising multi-pathing software of the host devices. Other types of host drivers can be used in other embodiments.

Multiple such algorithms can be implemented in parallel with one another for providing efficient data prefetch for multiple storage controllers for different host devices and/or different sets of storage controllers in a storage system.

Also, although the example algorithm described above illustratively utilizes MPIO drivers of respective host devices, other embodiments can be implemented outside of any multi-pathing software of the host devices. For example, other host device components can be used to provide data size indications to a storage array or other storage system.

It should also be noted that the example algorithm described above is not limited to use with particular types of IOs or IO command formats. For example, IOs comprising one or more commands of a standard storage access protocol, such as the above-noted SCSI and NVMe access protocols, can be utilized.

It is to be appreciated that the particular algorithm steps described above and elsewhere herein are presented by way of illustrative example only, and additional or alternative steps can be used in other embodiments. Also, the order of the steps can be varied, and/or at least some of the steps can be performed at least in part in parallel with one another. Other arrangements for efficient data prefetch for multiple storage controllers can be used in other embodiments.

Additional examples of illustrative embodiments implementing efficient data prefetch for multiple storage controllers will now be described with reference to FIGS. 2 through 4.

Figure 2:
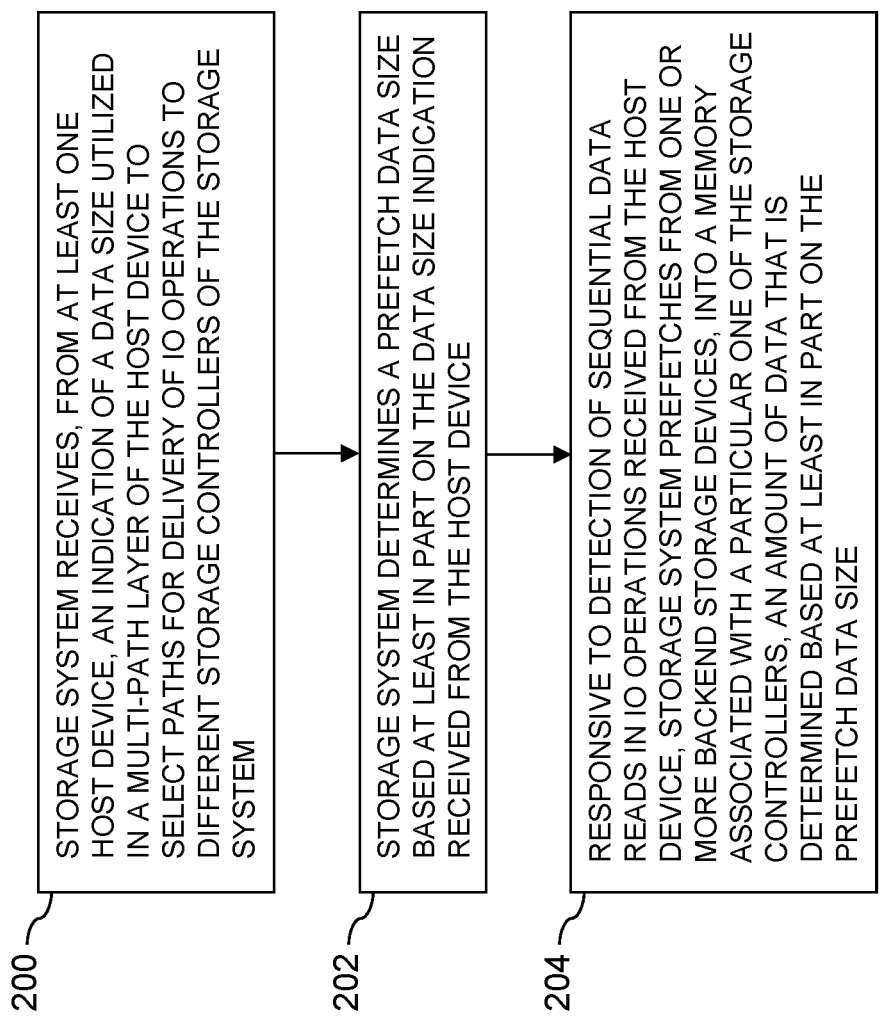
FIG. 2 is a flow diagram of an example process for providing efficient data prefetch for multiple storage controllers in an illustrative embodiment.

Referring initially to FIG. 2, an example process for providing efficient data prefetch for multiple storage controllers is illustrated. The process as shown includes steps 200 through 204, and is suitable for use in the system 100 but is more generally applicable to other types of systems comprising at least one host device and a storage system. The storage system in this embodiment is assumed to comprise at least one storage array having a plurality of storage devices, illustratively referred to as backend storage devices, and a plurality of storage controllers each having an associated memory. The FIG. 2 process is illustratively performed primarily in a storage array or other storage system, through cooperative interaction or other collaboration with at least one host device comprising an MPIO driver with path selection logic and associated prefetch control logic. Other embodiments can involve other system components, such as an external server comprising an MPIO management station.

In step 200, a storage system receives, from at least one host device, an indication of a data size utilized in a multi-path layer of the host device to select paths for delivery of IO operations to different storage controllers of the storage system. For example, the data size indication received from the host device in some embodiments comprises a particular data size value, such as an indication of a particular number of data blocks of at least one designated block size. The configurable parameter X in the algorithm described above is one possible example of such an indication of data size that may be conveyed from a host device to a storage array in an illustrative embodiment.

The data size indication may specify, for example, an amount of sequential read data after which an MPIO driver of the host will switch from sending IO operations over at least one path to one of the storage controllers of the storage system to sending IO operations over at least one path to another one of the storage controllers of the storage system. This switching is illustratively performed in accordance with an adaptive load balancing policy of the MPIO driver in which the other one of the storage controllers to which the MPIO driver will switch is unknown to the storage system prior to that switch.

In step 202, the storage system determines a prefetch data size based at least in part on the data size indication received from the host device. For example, the storage system can simply set the prefetch data size to the above-noted particular data size value. The storage system may instead set the prefetch data size as a function of the particular data size value or other data size indication received from the host device.

In step 204, responsive to detection of sequential data reads in IO operations received from the host device, the storage system prefetches from one or more backend storage devices, into a memory associated with a particular one of the storage controllers, an amount of data that is determined based at least in part on the prefetch data size.

For example, in some embodiments, the storage system detects the sequential data reads in conjunction with receipt of IO operations directed to a first one of the storage controllers, and in response thereto prefetches an amount of data given by the prefetch data size into a first memory associated with the first storage controller. The storage system then subsequently detects additional sequential data reads in conjunction with receipt of IO operations directed to a second one of the storage controllers, and in response thereto transfers a remaining unread portion of the amount of data prefetched into the first memory associated with the first storage controller into a second memory associated with the second storage controller.

The particular processing operations and other system functionality described in conjunction with the flow diagram of FIG. 2 are presented by way of illustrative example only, and should not be construed as limiting the scope of the disclosure in any way. Alternative embodiments can use other types of processing operations involving host devices, storage systems and functionality for providing efficient data prefetch for multiple storage controllers. For example, the ordering of the process steps may be varied in other embodiments, or certain steps may be performed at least in part concurrently with one another rather than serially. Also, one or more of the process steps may be repeated periodically, or multiple instances of the process can be performed in parallel with one another in order to implement a plurality of different arrangements for providing efficient data prefetch for different host devices and/or different sets of storage controllers.

Functionality such as that described in conjunction with the flow diagram of FIG. 2 can be implemented at least in part in the form of one or more software programs stored in memory and executed by a processor of a processing device such as a computer or server. As will be described below, a memory or other storage device having executable program code of one or more software programs embodied therein is an example of what is more generally referred to herein as a "processor-readable storage medium."

Figure 3:
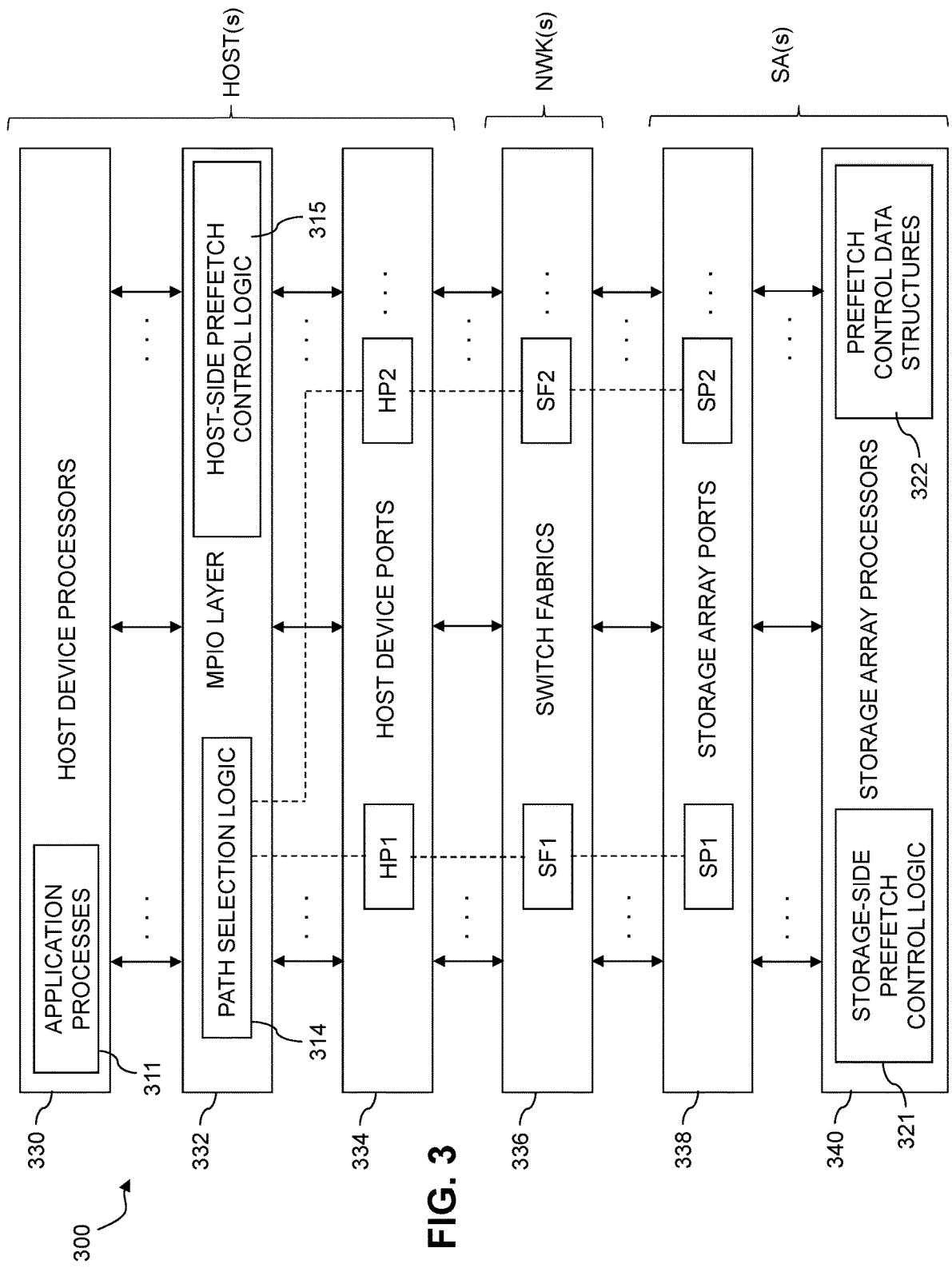
FIG. 3 is a block diagram showing multiple layers of a layered system architecture that incorporates functionality for providing efficient data prefetch for multiple storage controllers in an illustrative embodiment.

Referring now to FIG. 3, another illustrative embodiment is shown. In this embodiment, an information processing system 300 comprises host-side elements that include application processes 311, path selection logic 314 and prefetch control logic 315. There are illustratively separate instances of one or more such host-side elements associated with each of a plurality of host devices of the system 300.

The system 300 further comprises storage-side elements including prefetch control logic 321 and prefetch control data structures 322 that are utilized, in cooperation with instances of prefetch control logic 315 of one or more host devices, in implementing efficient data prefetch for multiple storage controllers in at least one storage array. There may be separate instances of one or more such storage-side elements associated with each of a plurality of storage arrays of the system 300.

The system 300 is configured in accordance with a layered system architecture that illustratively includes a host device processor layer 330, an MPIO layer 332, a host device port layer 334, a switch fabric layer 336, a storage array port layer 338 and a storage array processor layer 340. The host device processor layer 330, the MPIO layer 332 and the host device port layer 334 are associated with one or more host devices, the switch fabric layer 336 is associated with one or more SANs or other types of networks, and the storage array port layer 338 and storage array processor layer 340 are associated with one or more storage arrays ("SAs").

The host device processors of the host device processor layer 330 can comprise, for example, respective VMs and/or processor virtualization containers (e.g., Docker containers), or additional or alternative processing entities that generate IO operations for delivery to one or more storage arrays.

The storage array processors of the storage array processor layer 340 may be viewed as corresponding to one or more storage controllers such as the storage controllers 120 of the storage array 105.

The application processes 311 of the host device processor layer 330 generate IO operations that are processed by the MPIO layer 332 for delivery to the one or more storage arrays over the SAN comprising switch fabrics of switch fabric layer 336. Paths are determined by the path selection logic 314 for sending such IO operations to the one or more storage arrays. Data size indications are provided by the prefetch control logic 315 to the one or more storage arrays, as indicated above.

The MPIO layer 332 is an example of what is also referred to herein as a multi-path layer, and comprises one or more MPIO drivers implemented in respective host devices. Each such MPIO driver illustratively comprises respective instances of path selection logic 314 and prefetch control logic 315 configured as previously described. Additional or alternative layers and logic arrangements can be used in other embodiments.

In a manner similar to that described elsewhere herein, the MPIO layer 332 comprising prefetch control logic 315 illustratively processes a plurality of IO operations generated by a given host device. The IO operations are sent by the MPIO layer 332 to a storage array over respective paths selected using one or more algorithms implemented by path selection logic 314. In addition, data size indications are illustratively sent by the MPIO layer 332 to the storage array, under the control of the prefetch control logic 315, and utilized in the storage array to determine a prefetch data size for use in prefetching data from backend storage devices into memories of storage controllers as disclosed herein.

In the system 300, path selection logic 314 is configured to select different paths for sending IO operations from a given host device to a storage array. These paths as illustrated in the figure include a first path from a particular host port denoted HP1 through a particular switch fabric denoted SF1 to a particular storage array port denoted SP1, and a second path from another particular host port denoted HP2 through another particular switch fabric denoted SF2 to another particular storage array port denoted SP2.

These two particular paths are shown by way of illustrative example only, and in many practical implementations there will typically be a much larger number of paths between the one or more hosts and the one or more storage arrays, depending upon the specific system configuration and its deployed numbers of host ports, switch fabrics and storage array ports. For example, each host in the FIG. 3 embodiment can illustratively have the same number and type of paths to a shared storage array, or alternatively different ones of the hosts can have different numbers and types of paths to the storage array.

The path selection logic 314 of the MPIO layer 332 in this embodiment selects paths for delivery of IO operations to the one or more storage arrays having the storage array ports of the storage array port layer 338. More particularly, the path selection logic 314 determines appropriate paths over which to send particular IO operations to particular logical storage devices of the one or more storage arrays.

In an example process for providing efficient data prefetch for multiple storage controllers in the system 300, an MPIO driver of the MPIO layer 332 via its prefetch control logic 315 sends data size indications to the one or more storage arrays, from which the one or more storage arrays via the storage-side prefetch control logic 321 determine prefetch data sizes for storage in the prefetch control data structures 322. A given such storage array via its prefetch control logic 321 determines a prefetch data size based at least in part on a data size indication received from the MPIO driver of a host device, and responsive to detection in the storage array of sequential data reads in IO operations received from the MPIO driver, prefetches from one or more backend storage devices of the storage array, into a memory associated with a particular one of the storage controllers of the storage array, an amount of data that is determined based at least in part on the prefetch data size.

The data size indication received from the MPIO driver illustratively specifies an amount of sequential read data after which the MPIO driver will switch from sending IO operations over at least one path to one of the storage controllers of the storage array to sending IO operations over at least one path to another one of the storage controllers of the storage array. This switching by the MPIO driver between storage controllers of the storage array is illustratively performed in accordance with an adaptive load balancing policy of the MPIO driver in which the other one of the storage controllers to which the MPIO will switch is unknown to the storage array prior to that switch.

The storage array illustratively detects the sequential data reads in conjunction with receipt of IO operations directed to a first one of the storage controllers, and in response thereto prefetches an amount of data given by the prefetch data size into a first memory associated with the first storage controller.

The storage array subsequently detects additional sequential data reads in conjunction with receipt of IO operations directed to a second one of the storage controllers, and in response thereto transfers a remaining unread portion of the amount of data prefetched into the first memory associated with the first storage controller into a second memory associated with the second storage controller.

As indicated above, the storage controllers can comprise or be otherwise associated with respective storage array processors of the storage array processor layer 340. Such storage controllers in some embodiments more particularly comprise respective storage directors, each associated with one or more of the storage array ports of the storage array port layer 338, although numerous other arrangements are possible.

Some implementations of the system 300 can include a relatively large number of host devices (e.g., 1000 or more host devices), although as indicated previously different numbers of host devices, and possibly only a single host device, may be present in other embodiments. Each of the host devices is typically allocated with a sufficient number of host ports to accommodate predicted performance needs. In some cases, the number of host ports per host device is on the order of 4, 8 or 16 host ports, although other numbers of host ports could be allocated to each host device depending upon the predicted performance needs. A typical storage array may include on the order of 128 ports, although again other numbers can be used based on the particular needs of the implementation. The number of host devices per storage array port in some cases can be on the order of 10 host devices per port. The host ports of the host devices are assumed to be zoned and masked to the storage array ports in accordance with the predicted performance needs, including user load predictions.

A given host device of system 300 can be configured to initiate an automated path discovery process to discover new paths responsive to updated zoning and masking or other types of storage system reconfigurations performed by a storage administrator or other user. For certain types of host devices, such as host devices using particular operating systems such as Windows, ESX or Linux, automated path discovery via the MPIO drivers of a multi-path layer is typically supported. Other types of host devices using other operating systems such as AIX in some implementations do not necessarily support such automated path discovery, in which case alternative techniques can be used to discover paths.

Referring now to FIG. 4, an example storage-side prefetch control data structure 400 utilized in providing efficient data prefetch for multiple storage controllers as disclosed herein is shown. The prefetch control data structure 400 illustratively corresponds to one of prefetch control data structures 122 or 322, and is maintained by a storage array, possibly at least in part under the control of its prefetch control logic 121 or 321.

In this embodiment, it is assumed that the storage array comprises a plurality of different sets of storage controllers, denoted Controller Set 1, Controller Set 2, . . . . Controller Set X, each of which is assumed to comprise multiple storage controllers of the storage array. The prefetch control data structure 400 stores, for each of the different sets of storage controllers, a corresponding prefetch data size that is determined from a data size indication provided by an MPIO driver of a given host device. The storage array utilizes the prefetch data size stored for a given one of the sets of controllers in the prefetch control data structure to control an amount of data to be prefetched responsive to detection of sequential reads directed to particular storage controllers of the given set of controllers.

In some embodiments, the different sets of controllers may be associated with respective different storage servers or other storage nodes in a distributed implementation of a given storage array, although numerous other arrangements are possible.

In other embodiments, the storage array may include only a single set of storage controllers, in which case the prefetch control data structure 400 would include only a single corresponding prefetch data size entry.

Additional or alternative information can be stored in the prefetch control data structure 400 in other embodiments, such as, for example, identifiers of the particular storage controllers that are part of each of the sets of storage controllers.

In some embodiments, the prefetch control data structure 400 can store the data size indication or indications received from the given host device, from which respective corresponding prefetch data sizes can be computed as needed by the storage array.

Accordingly, the particular prefetch control data structure arrangement shown in FIG. 4 is only an example, and numerous other types and arrangements of prefetch data size information can be maintained by a storage system in one or more tables or other data structures in other embodiments. Terms such as "data size indication," "prefetch data size" and "data structure" as used herein are intended to be broadly construed.

The above-described processes, algorithms and other features and functionality disclosed herein are presented by way of illustrative example only, and other embodiments can utilize additional or alternative arrangements.

Also, as mentioned previously, different instances of the above-described processes, algorithms and other techniques for providing efficient data prefetch for multiple storage controllers can be performed using different system components.

For example, various aspects of functionality for providing efficient data prefetch for multiple storage controllers in some embodiments can be implemented at least in part using one or more servers that are external to a storage array 105 or other type of storage system. Also, processing logic can be implemented using other types of host drivers, such as, for example, SCSI drivers, NVMe drivers or more generally other host device components.

The particular arrangements described above for implementing efficient data prefetch for multiple storage controllers are therefore presented by way of illustrative example only. Numerous alternative arrangements of these and other features can be used in implementing efficient data prefetch for multiple storage controllers in other illustrative embodiments.

As indicated previously, the illustrative embodiments disclosed herein can provide a number of significant advantages relative to conventional arrangements.

For example, some embodiments are advantageously configured to provide techniques for collaboration between a storage array or other storage system and one or more host devices in order to implement efficient data prefetch for multiple storage controllers.

These and other embodiments can dynamically provide, at least in part under the control of one or more host devices, data size indications for use by a storage array or other storage system in determining corresponding prefetch data sizes, so as to better control amounts of data prefetched by the storage system into memories of respective storage controllers responsive to detection of sequential reads targeting those storage controllers.

Such arrangements can significantly increase the number of read hits for sequential IOs, leading to improved system performance.

Various aspects of functionality associated with efficient data prefetch for multiple storage controllers as disclosed herein can be implemented in a host device, in a storage system, or partially in a host device and partially in a storage system, and additionally or alternatively using other arrangements of one or more processing devices each comprising at least a processor and a memory coupled to the processor.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

It was noted above that portions of an information processing system as disclosed herein may be implemented using one or more processing platforms. Illustrative embodiments of such platforms will now be described in greater detail. These and other processing platforms may be used to implement at least portions of other information processing systems in other embodiments. A given such processing platform comprises at least one processing device comprising a processor coupled to a memory.

One illustrative embodiment of a processing platform that may be used to implement at least a portion of an information processing system comprises cloud infrastructure including virtual machines implemented using a hypervisor that runs on physical infrastructure. The cloud infrastructure further comprises sets of applications running on respective ones of the virtual machines under the control of the hypervisor. It is also possible to use multiple hypervisors each providing a set of virtual machines using at least one underlying physical machine. Different sets of virtual machines provided by one or more hypervisors may be utilized in configuring multiple instances of various components of the system.

These and other types of cloud infrastructure can be used to provide what is also referred to herein as a multi-tenant environment. One or more system components such as virtual machines, or portions thereof, are illustratively implemented for use by tenants of such a multi-tenant environment.

Cloud infrastructure as disclosed herein can include cloud-based systems implemented at least in part using virtualization infrastructure such as virtual machines and associated hypervisors. For example, virtual machines provided in such systems can be used to implement a fast tier or other front-end tier of a multi-tier storage system in illustrative embodiments. A capacity tier or other back-end tier of such a multi-tier storage system can be implemented using one or more object stores.

In some embodiments, the cloud infrastructure additionally or alternatively comprises a plurality of containers illustratively implemented using respective operating system kernel control groups of one or more container host devices. For example, a given container of cloud infrastructure illustratively comprises a Docker container or other type of LXC implemented using a kernel control group. The containers may run on virtual machines in a multi-tenant environment, although other arrangements are possible. The containers may be utilized to implement a variety of different types of functionality within the system 100. For example, containers can be used to implement respective compute nodes or storage nodes of a cloud-based system. Again, containers may be used in combination with other virtualization infrastructure such as virtual machines implemented using a hypervisor.

Another illustrative embodiment of a processing platform that may be used to implement at least a portion of an information processing system comprises a plurality of processing devices which communicate with one another over at least one network. The network may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

Each processing device of the processing platform comprises a processor coupled to a memory. The processor may comprise a microprocessor, a microcontroller, an application-specific integrated circuit (ASIC), a field-programmable gate array (FPGA), a graphics processing unit (GPU) or other type of processing circuitry, as well as portions or combinations of such circuitry elements. The memory may comprise random access memory (RAM), read-only memory (ROM), flash memory or other types of memory, in any combination. The memory and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals.

Also included in the processing device is network interface circuitry, which is used to interface the processing device with the network and other system components, and may comprise conventional transceivers.

As another example, portions of a given processing platform in some embodiments can comprise converged infrastructure.

Again, these particular processing platforms are presented by way of example only, and other embodiments may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in an information processing system as disclosed herein. Such components can communicate with other elements of the information processing system over any type of network or other communication media.

As indicated previously, components of an information processing system as disclosed herein can be implemented at least in part in the form of one or more software programs stored in memory and executed by a processor of a processing device. For example, at least portions of the functionality of host devices 102, SAN 104 and storage array 105 are illustratively implemented in the form of software running on one or more processing devices. As a more particular example, the instances of path selection logic 114 and prefetch control logic 115 may be implemented at least in part in software, as indicated previously herein. Storage-side prefetch control logic 121 can similarly be implemented at least in part in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, utilizing other arrangements of host devices, networks, storage systems, storage arrays, storage devices, storage controllers, processors, memories, IO queues, MPIO drivers, initiators, targets, path selection logic, prefetch control logic, data structures, and additional or alternative components. Also, the particular configurations of system and device elements and associated processing operations illustratively shown in the drawings can be varied in other embodiments. For example, a wide variety of different host device and storage system configurations and associated arrangements for providing efficient data prefetch for multiple storage controllers can be used in other embodiments. Moreover, the various assumptions made above in the course of describing the illustrative embodiments should also be viewed as exemplary rather than as requirements or limitations. Numerous other alternative embodiments within the scope of the appended claims will be readily apparent to those skilled in the art.

What is claimed is:

1. An apparatus comprising:
at least one processing device comprising a processor coupled to a memory;
the at least one processing device being configured:
to receive in a storage system from at least one host device an indication of a data size utilized in a multi-path layer of the host device to select paths for delivery of input-output operations to different storage controllers of the storage system;
to determine in the storage system a prefetch data size based at least in part on the data size indication received from the host device; and
responsive to detection in the storage system of sequential data reads in input-output operations received from the host device, to prefetch from one or more backend storage devices of the storage system, into a memory associated with a particular one of the storage controllers of the storage system, an amount of data that is determined based at least in part on the prefetch data size.

2. The apparatus of claim 1 wherein the at least one processing device comprises at least a portion of the storage system.

3. The apparatus of claim 1 wherein the data size indication received from the host device comprises a particular data size value.

4. The apparatus of claim 3 wherein the particular data size value comprises an indication of a particular number of data blocks of at least one designated block size.

5. The apparatus of claim 3 wherein the prefetch data size is set to the particular data size value.

6. The apparatus of claim 1 wherein the data size indication is provided from the host device to the storage system utilizing at least one of a log select command and a mode select command issued by the host device.

7. The apparatus of claim 1 wherein the data size indication received from the host device specifies an amount of sequential read data after which at least one multi-path input-output driver of the host device will switch from sending input-output operations over at least one path to one of the storage controllers of the storage system to sending input-output operations over at least one path to another one of the storage controllers of the storage system.

8. The apparatus of claim 7 wherein the switching from sending input-output operations over at least one path to one of the storage controllers to sending input-output operations over at least one path to another one of the storage controllers is performed in accordance with an adaptive load balancing policy of the multi-path input-output driver in which the other one of the storage controllers to which the multi-path input-output driver will switch is unknown to the storage system prior to that switch.

9. The apparatus of claim 1 wherein the storage controllers of the storage system comprise respective directors of the storage system.

10. The apparatus of claim 1 wherein the storage system detects the sequential data reads in conjunction with receipt of input-output operations directed to a first one of the storage controllers, and in response thereto prefetches an amount of data given by the prefetch data size into a first memory associated with the first storage controller.

11. The apparatus of claim 10 wherein the storage system subsequently detects additional sequential data reads in conjunction with receipt of input-output operations directed to a second one of the storage controllers, and in response thereto transfers a remaining unread portion of the amount of data prefetched into the first memory associated with the first storage controller into a second memory associated with the second storage controller.

12. A computer program product comprising a non-transitory processor-readable storage medium having stored therein program code of one or more software programs, wherein the program code, when executed by at least one processing device comprising a processor coupled to a memory, causes the at least one processing device:

to receive in a storage system from at least one host device an indication of a data size utilized in a multi-path layer of the host device to select paths for delivery of input-output operations to different storage controllers of the storage system;

to determine in the storage system a prefetch data size based at least in part on the data size indication received from the host device; and responsive to detection in the storage system of sequential data reads in input-output operations received from the host device, to prefetch from one or more backend storage devices of the storage system, into a memory associated with a particular one of the storage controllers of the storage system, an amount of data that is determined based at least in part on the prefetch data size.

13. The computer program product of claim 12 wherein the data size indication received from the host device specifies an amount of sequential read data after which at least one multi-path input-output driver of the host device will switch from sending input-output operations over at least one path to one of the storage controllers of the storage system to sending input-output operations over at least one path to another one of the storage controllers of the storage system.

14. The computer program product of claim 12 wherein the storage system detects the sequential data reads in conjunction with receipt of input-output operations directed to a first one of the storage controllers, and in response thereto prefetches an amount of data given by the prefetch data size into a first memory associated with the first storage controller.

15. The computer program product of claim 14 wherein the storage system subsequently detects additional sequential data reads in conjunction with receipt of input-output operations directed to a second one of the storage controllers, and in response thereto transfers a remaining unread portion of the amount of data prefetched into the first memory associated with the first storage controller into a second memory associated with the second storage controller.

16. A method comprising:

receiving in a storage system from at least one host device an indication of a data size utilized in a multi-path layer of the host device to select paths for delivery of input-output operations to different storage controllers of the storage system;

determining in the storage system a prefetch data size based at least in part on the data size indication received from the host device; and responsive to detection in the storage system of sequential data reads in input-output operations received from the host device, prefetching from one or more backend storage devices of the storage system, into a memory associated with a particular one of the storage controllers of the storage system, an amount of data that is determined based at least in part on the prefetch data size.

17. The method of claim 16 wherein the data size indication received from the host device specifies an amount of sequential read data after which at least one multi-path input-output driver of the host device will switch from sending input-output operations over at least one path to one of the storage controllers of the storage system to sending input-output operations over at least one path to another one of the storage controllers of the storage system.

18. The method of claim 17 wherein the switching from sending input-output operations over at least one path to one of the storage controllers to sending input-output operations over at least one path to another one of the storage controllers is performed in accordance with an adaptive load balancing policy of the multi-path input-output driver in which the other one of the storage controllers to which the multi-path input-output driver will switch is unknown to the storage system prior to that switch.

19. The method of claim 16 wherein the storage system detects the sequential data reads in conjunction with receipt of input-output operations directed to a first one of the storage controllers, and in response thereto prefetches an amount of data given by the prefetch data size into a first memory associated with the first storage controller.

20. The method of claim 19 wherein the storage system subsequently detects additional sequential data reads in conjunction with receipt of input-output operations directed to a second one of the storage controllers, and in response thereto transfers a remaining unread portion of the amount of data prefetched into the first memory associated with the first storage controller into a second memory associated with the second storage controller.

* * * * *